(12) United States Patent
Caudy et al.

(10) Patent No.: US 10,922,311 B2
(45) Date of Patent: Feb. 16, 2021

(54) DYNAMIC UPDATING OF QUERY RESULT DISPLAYS

(71) Applicant: Deephaven Data Labs LLC, Plymouth, MN (US)

(72) Inventors: Ryan Caudy, New York, NY (US); David R. Kent, IV, Colorado Springs, CO (US); Charles Wright, Cortlandt Manor, NY (US); Brian Ries, St. Louis Park, MN (US); Radu Teodorescu, New York, NY (US)

(73) Assignee: Deephaven Data Labs LLC, Plymouth, MN (US)

( * ) Notice: Subject to any disclaimer, the term of this patent is extended or adjusted under 35 U.S.C. 154(b) by 0 days.

(21) Appl. No.: 15/154,997

(22) Filed: May 14, 2016

(65) Prior Publication Data

US 2016/0335330 A1    Nov. 17, 2016

Related U.S. Application Data

(60) Provisional application No. 62/161,813, filed on May 14, 2015.

(51) Int. Cl.
*G06F 7/00* (2006.01)
*G06F 16/2453* (2019.01)
(Continued)

(52) U.S. Cl.
CPC ........ *G06F 16/2453* (2019.01); *G06F 3/0481* (2013.01); *G06F 3/0482* (2013.01); *G06F 3/0483* (2013.01); *G06F 3/0485* (2013.01); *G06F 3/04847* (2013.01); *G06F 3/04895* (2013.01); *G06F 3/0605* (2013.01); *G06F 3/067* (2013.01); *G06F 3/0656* (2013.01); *G06F 8/30* (2013.01); *G06F 8/41* (2013.01); *G06F 8/427* (2013.01); *G06F 8/60* (2013.01); *G06F 11/1451* (2013.01); *G06F 11/1464* (2013.01); *G06F 11/1469* (2013.01); *G06F 12/0261* (2013.01); *G06F 12/084* (2013.01); *G06F 12/1483* (2013.01); *G06F 15/17331* (2013.01); *G06F 16/113* (2019.01); *G06F 16/144* (2019.01); *G06F 16/162* (2019.01);
(Continued)

(58) Field of Classification Search
CPC ............................ G06F 16/2453; G06F 16/27
USPC .......................................................... 707/639
See application file for complete search history.

(56) References Cited

U.S. PATENT DOCUMENTS

| | | |
|---|---|---|
| 5,335,202 A | 8/1994 | Manning et al. |
| 5,452,434 A | 9/1995 | Macdonald |

(Continued)

FOREIGN PATENT DOCUMENTS

| | | |
|---|---|---|
| CA | 2309462 A1 | 12/2000 |
| EP | 1406463 A2 | 4/2004 |

(Continued)

OTHER PUBLICATIONS

Final Office Action dated Aug. 10, 2018, in U.S. Appl. No. 15/796,230.
(Continued)

*Primary Examiner* — Eliyah S. Harper
(74) *Attorney, Agent, or Firm* — Carmichael IP, PLLC

(57) ABSTRACT

Described are methods, systems and computer readable media for dynamic updating of query result displays.

20 Claims, 7 Drawing Sheets

(51) Int. Cl.

| | |
|---|---|
| *G06F 16/23* | (2019.01) |
| *G06F 16/22* | (2019.01) |
| *G06F 16/27* | (2019.01) |
| *G06F 16/16* | (2019.01) |
| *G06F 16/215* | (2019.01) |
| *G06F 16/245* | (2019.01) |
| *G06F 16/248* | (2019.01) |
| *G06F 16/25* | (2019.01) |
| *G06F 16/28* | (2019.01) |
| *G06F 16/907* | (2019.01) |
| *G06F 16/951* | (2019.01) |
| *G06F 16/242* | (2019.01) |
| *G06F 16/2455* | (2019.01) |
| *G06F 16/2457* | (2019.01) |
| *G06F 16/901* | (2019.01) |
| *G06F 16/9535* | (2019.01) |
| *G06F 16/955* | (2019.01) |
| *G06F 16/957* | (2019.01) |
| *G06F 21/00* | (2013.01) |
| *G06F 21/62* | (2013.01) |
| *G06F 40/18* | (2020.01) |
| *G06F 40/134* | (2020.01) |
| *G06F 40/166* | (2020.01) |
| *G06F 40/177* | (2020.01) |
| *G06F 40/216* | (2020.01) |
| *G06F 40/274* | (2020.01) |
| *G06F 40/117* | (2020.01) |
| *G06F 40/183* | (2020.01) |
| *G06F 40/174* | (2020.01) |
| *G06F 3/0482* | (2013.01) |
| *G06F 3/0489* | (2013.01) |
| *G06F 12/084* | (2016.01) |
| *H04L 12/58* | (2006.01) |
| *G06F 15/173* | (2006.01) |
| *G06F 3/0481* | (2013.01) |
| *G06F 3/0484* | (2013.01) |
| *G06F 3/0485* | (2013.01) |
| *G06F 12/02* | (2006.01) |
| *G06F 8/30* | (2018.01) |
| *G06F 8/41* | (2018.01) |
| *H04L 29/08* | (2006.01) |
| *G06F 3/06* | (2006.01) |
| *G06F 11/14* | (2006.01) |
| *H04L 29/06* | (2006.01) |
| *G06F 8/60* | (2018.01) |
| *H04L 12/18* | (2006.01) |
| *H04L 29/12* | (2006.01) |
| *G06F 12/14* | (2006.01) |
| *G06F 3/0483* | (2013.01) |
| *G06F 16/14* | (2019.01) |
| *G06F 16/11* | (2019.01) |
| *G06F 17/40* | (2006.01) |
| *G06Q 40/04* | (2012.01) |

(52) U.S. Cl.
CPC ............ *G06F 16/215* (2019.01); *G06F 16/22* (2019.01); *G06F 16/221* (2019.01); *G06F 16/2228* (2019.01); *G06F 16/2237* (2019.01); *G06F 16/2246* (2019.01); *G06F 16/2255* (2019.01); *G06F 16/2264* (2019.01); *G06F 16/2272* (2019.01); *G06F 16/2282* (2019.01); *G06F 16/23* (2019.01); *G06F 16/2308* (2019.01); *G06F 16/2358* (2019.01); *G06F 16/2365* (2019.01); *G06F 16/2372* (2019.01); *G06F 16/2379* (2019.01); *G06F 16/242* (2019.01); *G06F 16/245* (2019.01); *G06F 16/248* (2019.01); *G06F 16/2428* (2019.01); *G06F 16/2455* (2019.01); *G06F 16/2456* (2019.01); *G06F 16/2457* (2019.01); *G06F 16/24534* (2019.01); *G06F 16/24535* (2019.01); *G06F 16/24537* (2019.01); *G06F 16/24539* (2019.01); *G06F 16/24553* (2019.01); *G06F 16/24561* (2019.01); *G06F 16/24575* (2019.01); *G06F 16/254* (2019.01); *G06F 16/27* (2019.01); *G06F 16/278* (2019.01); *G06F 16/285* (2019.01); *G06F 16/907* (2019.01); *G06F 16/9024* (2019.01); *G06F 16/951* (2019.01); *G06F 16/9535* (2019.01); *G06F 16/9566* (2019.01); *G06F 16/9574* (2019.01); *G06F 21/00* (2013.01); *G06F 21/6209* (2013.01); *G06F 40/117* (2020.01); *G06F 40/134* (2020.01); *G06F 40/166* (2020.01); *G06F 40/174* (2020.01); *G06F 40/177* (2020.01); *G06F 40/18* (2020.01); *G06F 40/183* (2020.01); *G06F 40/216* (2020.01); *G06F 40/274* (2020.01); *H04L 12/18* (2013.01); *H04L 51/046* (2013.01); *H04L 51/12* (2013.01); *H04L 61/2069* (2013.01); *H04L 63/101* (2013.01); *H04L 63/102* (2013.01); *H04L 67/1002* (2013.01); *H04L 67/141* (2013.01); *H04L 67/28* (2013.01); *H04L 67/2833* (2013.01); *H04L 67/2842* (2013.01); *H04L 67/34* (2013.01); *H04L 67/42* (2013.01); *H04L 69/16* (2013.01); *G06F 16/2291* (2019.01); *G06F 17/40* (2013.01); *G06F 2201/805* (2013.01); *G06F 2201/84* (2013.01); *G06F 2212/1052* (2013.01); *G06F 2212/154* (2013.01); *G06F 2212/163* (2013.01); *G06F 2212/60* (2013.01); *G06Q 40/04* (2013.01); *H04L 67/2847* (2013.01)

(56) References Cited

U.S. PATENT DOCUMENTS

| | | |
|---|---|---|
| 5,469,567 A | 11/1995 | Okada |
| 5,504,885 A | 4/1996 | Alashqur |
| 5,530,939 A | 6/1996 | Mansfield et al. |
| 5,568,632 A | 10/1996 | Nelson |
| 5,673,369 A | 9/1997 | Kim |
| 5,701,461 A | 12/1997 | Dalal et al. |
| 5,701,467 A | 12/1997 | Freeston |
| 5,764,953 A | 6/1998 | Collins et al. |
| 5,787,411 A | 7/1998 | Groff et al. |
| 5,787,428 A | 7/1998 | Hart |
| 5,806,059 A | 9/1998 | Tsuchida et al. |
| 5,808,911 A | 9/1998 | Tucker et al. |
| 5,859,972 A | 1/1999 | Subramaniam et al. |
| 5,873,075 A | 2/1999 | Cochrane et al. |
| 5,875,334 A | 2/1999 | Chow et al. |
| 5,878,415 A | 3/1999 | Olds |
| 5,890,167 A | 3/1999 | Bridge et al. |
| 5,899,990 A | 5/1999 | Maritzen et al. |
| 5,920,860 A | 7/1999 | Maheshwari et al. |
| 5,943,672 A | 8/1999 | Yoshida |
| 5,960,087 A | 9/1999 | Tribble et al. |
| 5,991,810 A | 11/1999 | Shapiro et al. |
| 5,999,918 A | 12/1999 | Williams et al. |
| 6,006,220 A | 12/1999 | Haderle et al. |
| 6,026,390 A | 2/2000 | Ross et al. |
| 6,032,144 A | 2/2000 | Srivastava et al. |
| 6,032,148 A | 2/2000 | Wilkes |
| 6,038,563 A | 3/2000 | Bapat et al. |
| 6,058,394 A | 5/2000 | Bakow et al. |
| 6,061,684 A | 5/2000 | Glasser et al. |

(56) References Cited

U.S. PATENT DOCUMENTS

| | | | |
|---|---|---|---|
| 6,138,112 | A | 10/2000 | Slutz |
| 6,160,548 | A * | 12/2000 | Lea ..................... G11B 27/002 |
| | | | 348/512 |
| 6,253,195 | B1 | 6/2001 | Hudis et al. |
| 6,266,669 | B1 | 7/2001 | Brodersen et al. |
| 6,289,357 | B1 | 9/2001 | Parker |
| 6,292,803 | B1 | 9/2001 | Richardson et al. |
| 6,304,876 | B1 | 10/2001 | Isip |
| 6,317,728 | B1 | 11/2001 | Kane |
| 6,327,702 | B1 | 12/2001 | Sauntry et al. |
| 6,336,114 | B1 | 1/2002 | Garrison |
| 6,353,819 | B1 | 3/2002 | Edwards et al. |
| 6,367,068 | B1 | 4/2002 | Vaidyanathan et al. |
| 6,389,414 | B1 | 5/2002 | Delo et al. |
| 6,389,462 | B1 | 5/2002 | Cohen et al. |
| 6,397,206 | B1 | 5/2002 | Hill et al. |
| 6,438,537 | B1 | 8/2002 | Netz et al. |
| 6,446,069 | B1 | 9/2002 | Yaung et al. |
| 6,460,037 | B1 | 10/2002 | Weiss et al. |
| 6,473,750 | B1 | 10/2002 | Petculescu et al. |
| 6,487,552 | B1 | 11/2002 | Lei et al. |
| 6,496,833 | B1 | 12/2002 | Goldberg et al. |
| 6,505,189 | B1 | 1/2003 | Au et al. |
| 6,505,241 | B2 | 1/2003 | Pitts |
| 6,510,551 | B1 | 1/2003 | Miller |
| 6,519,604 | B1 | 2/2003 | Acharya et al. |
| 6,530,075 | B1 | 3/2003 | Beadle et al. |
| 6,538,651 | B1 | 3/2003 | Hayman et al. |
| 6,546,402 | B1 | 4/2003 | Beyer et al. |
| 6,553,375 | B1 | 4/2003 | Huang et al. |
| 6,584,474 | B1 | 6/2003 | Pereira |
| 6,604,104 | B1 | 8/2003 | Smith |
| 6,618,720 | B1 | 9/2003 | Au et al. |
| 6,631,374 | B1 | 10/2003 | Klein et al. |
| 6,640,234 | B1 | 10/2003 | Coffen et al. |
| 6,697,880 | B1 | 2/2004 | Dougherty |
| 6,701,415 | B1 | 3/2004 | Hendren |
| 6,714,962 | B1 | 3/2004 | Helland et al. |
| 6,725,243 | B2 | 4/2004 | Snapp |
| 6,732,100 | B1 | 5/2004 | Brodersen et al. |
| 6,745,332 | B1 | 6/2004 | Wong et al. |
| 6,748,374 | B1 | 6/2004 | Madan et al. |
| 6,748,455 | B1 | 6/2004 | Hinson et al. |
| 6,760,719 | B1 | 7/2004 | Hanson et al. |
| 6,775,660 | B2 | 8/2004 | Lin et al. |
| 6,785,668 | B1 | 8/2004 | Polo et al. |
| 6,795,851 | B1 | 9/2004 | Noy |
| 6,801,908 | B1 | 10/2004 | Fuloria et al. |
| 6,816,855 | B2 | 11/2004 | Hartel et al. |
| 6,820,082 | B1 | 11/2004 | Cook et al. |
| 6,829,620 | B2 | 12/2004 | Michael et al. |
| 6,832,229 | B2 | 12/2004 | Reed |
| 6,851,088 | B1 | 2/2005 | Conner et al. |
| 6,882,994 | B2 | 4/2005 | Yoshimura et al. |
| 6,925,472 | B2 | 8/2005 | Kong |
| 6,934,717 | B1 | 8/2005 | James |
| 6,947,928 | B2 | 9/2005 | Dettinger et al. |
| 6,983,291 | B1 | 1/2006 | Cochrane et al. |
| 6,985,895 | B2 | 1/2006 | Witkowski et al. |
| 6,985,899 | B2 | 1/2006 | Chan et al. |
| 6,985,904 | B1 | 1/2006 | Kaluskar et al. |
| 7,020,649 | B2 | 3/2006 | Cochrane et al. |
| 7,024,414 | B2 | 4/2006 | Sah et al. |
| 7,031,962 | B2 | 4/2006 | Moses |
| 7,047,484 | B1 | 5/2006 | Becker et al. |
| 7,058,657 | B1 | 6/2006 | Berno |
| 7,089,228 | B2 | 8/2006 | Arnold et al. |
| 7,089,245 | B1 | 8/2006 | George et al. |
| 7,096,216 | B2 | 8/2006 | Anonsen |
| 7,099,927 | B2 | 8/2006 | Cudd et al. |
| 7,103,608 | B1 | 9/2006 | Ozbutun et al. |
| 7,110,997 | B1 | 9/2006 | Turkel et al. |
| 7,127,462 | B2 | 10/2006 | Hiraga et al. |
| 7,146,357 | B2 | 12/2006 | Suzuki et al. |
| 7,149,742 | B1 | 12/2006 | Eastham et al. |
| 7,167,870 | B2 | 1/2007 | Avvari et al. |
| 7,171,469 | B2 | 1/2007 | Ackaouy et al. |
| 7,174,341 | B2 | 2/2007 | Ghukasyan et al. |
| 7,181,686 | B1 | 2/2007 | Bahrs |
| 7,188,105 | B2 | 3/2007 | Dettinger et al. |
| 7,200,620 | B2 | 4/2007 | Gupta |
| 7,216,115 | B1 | 5/2007 | Walters et al. |
| 7,216,116 | B1 | 5/2007 | Nilsson et al. |
| 7,219,302 | B1 | 5/2007 | O'Shaughnessy et al. |
| 7,225,189 | B1 | 5/2007 | McCormack et al. |
| 7,254,808 | B2 | 8/2007 | Trappen et al. |
| 7,257,689 | B1 | 8/2007 | Baird |
| 7,272,605 | B1 | 9/2007 | Hinshaw et al. |
| 7,308,580 | B2 | 12/2007 | Nelson et al. |
| 7,316,003 | B1 | 1/2008 | Dulepet et al. |
| 7,330,969 | B2 | 2/2008 | Harrison et al. |
| 7,333,941 | B1 | 2/2008 | Choi |
| 7,343,585 | B1 | 3/2008 | Lau et al. |
| 7,350,237 | B2 | 3/2008 | Vogel et al. |
| 7,380,242 | B2 | 5/2008 | Alaluf |
| 7,401,088 | B2 | 7/2008 | Chintakayala et al. |
| 7,426,521 | B2 | 9/2008 | Harter |
| 7,430,549 | B2 | 9/2008 | Zane et al. |
| 7,433,863 | B2 | 10/2008 | Zane et al. |
| 7,447,865 | B2 | 11/2008 | Uppala et al. |
| 7,478,094 | B2 | 1/2009 | Ho et al. |
| 7,484,096 | B1 | 1/2009 | Garg et al. |
| 7,493,311 | B1 | 2/2009 | Cutsinger et al. |
| 7,506,055 | B2 | 3/2009 | McClain et al. |
| 7,523,462 | B1 | 4/2009 | Nesamoney et al. |
| 7,529,734 | B2 | 5/2009 | Dirisala |
| 7,529,750 | B2 | 5/2009 | Bair |
| 7,542,958 | B1 | 6/2009 | Warren et al. |
| 7,552,223 | B1 | 6/2009 | Ackaouy et al. |
| 7,596,550 | B2 | 9/2009 | Mordvinov et al. |
| 7,610,351 | B1 | 10/2009 | Gollapudi et al. |
| 7,620,687 | B2 | 11/2009 | Chen et al. |
| 7,624,126 | B2 | 11/2009 | Pizzo et al. |
| 7,627,603 | B2 | 12/2009 | Rosenblum et al. |
| 7,661,141 | B2 | 2/2010 | Dutta et al. |
| 7,664,778 | B2 | 2/2010 | Yagoub et al. |
| 7,672,275 | B2 | 3/2010 | Yajnik et al. |
| 7,680,782 | B2 | 3/2010 | Chen et al. |
| 7,711,716 | B2 | 5/2010 | Stonecipher |
| 7,711,740 | B2 | 5/2010 | Minore et al. |
| 7,711,788 | B2 | 5/2010 | Ran et al. |
| 7,747,640 | B2 | 6/2010 | Dettinger et al. |
| 7,761,444 | B2 | 7/2010 | Zhang et al. |
| 7,797,356 | B2 | 9/2010 | Iyer et al. |
| 7,827,204 | B2 | 11/2010 | Heinzel et al. |
| 7,827,403 | B2 | 11/2010 | Wong et al. |
| 7,827,523 | B2 | 11/2010 | Ahmed et al. |
| 7,882,121 | B2 | 2/2011 | Bruno et al. |
| 7,882,132 | B2 | 2/2011 | Ghatare |
| 7,895,191 | B2 | 2/2011 | Colossi et al. |
| 7,904,487 | B2 | 3/2011 | Ghatare |
| 7,908,259 | B2 | 3/2011 | Branscome et al. |
| 7,908,266 | B2 | 3/2011 | Zeringue et al. |
| 7,930,412 | B2 | 4/2011 | Yeap et al. |
| 7,966,311 | B2 | 6/2011 | Haase |
| 7,966,312 | B2 | 6/2011 | Nolan et al. |
| 7,966,343 | B2 | 6/2011 | Yang et al. |
| 7,970,777 | B2 | 6/2011 | Saxena et al. |
| 7,979,431 | B2 | 7/2011 | Qazi et al. |
| 7,984,043 | B1 | 7/2011 | Waas |
| 8,019,795 | B2 | 9/2011 | Anderson et al. |
| 8,027,293 | B2 | 9/2011 | Spaur et al. |
| 8,032,525 | B2 | 10/2011 | Bowers et al. |
| 8,037,542 | B2 | 10/2011 | Taylor et al. |
| 8,046,394 | B1 | 10/2011 | Shatdal |
| 8,046,749 | B1 | 10/2011 | Owen et al. |
| 8,055,672 | B2 | 11/2011 | Djugash et al. |
| 8,060,484 | B2 | 11/2011 | Bandera et al. |
| 8,171,018 | B2 | 5/2012 | Zane et al. |
| 8,180,623 | B2 | 5/2012 | Lendermann et al. |
| 8,180,789 | B1 | 5/2012 | Wasserman et al. |
| 8,196,121 | B2 | 6/2012 | Peshansky et al. |
| 8,209,356 | B1 | 6/2012 | Roesler |
| 8,286,189 | B2 | 10/2012 | Kukreja et al. |

(56) References Cited

U.S. PATENT DOCUMENTS

| | | | |
|---|---|---|---|
| 8,321,833 B2 | 11/2012 | Langworthy et al. |
| 8,332,435 B2 | 12/2012 | Ballard et al. |
| 8,359,305 B1 | 1/2013 | Burke et al. |
| 8,375,127 B1 | 2/2013 | Lita |
| 8,380,757 B1 | 2/2013 | Bailey et al. |
| 8,418,142 B2 | 4/2013 | Ao et al. |
| 8,433,701 B2 | 4/2013 | Sargeant et al. |
| 8,458,218 B2 | 6/2013 | Wildermuth |
| 8,473,897 B2 | 6/2013 | Box et al. |
| 8,478,713 B2 | 7/2013 | Cotner et al. |
| 8,515,942 B2 | 8/2013 | Marum et al. |
| 8,543,620 B2 | 9/2013 | Ching |
| 8,553,028 B1 | 10/2013 | Urbach |
| 8,555,263 B2 | 10/2013 | Allen et al. |
| 8,560,502 B2 | 10/2013 | Vora |
| 8,595,151 B2 | 11/2013 | Hao et al. |
| 8,601,016 B2 | 12/2013 | Briggs et al. |
| 8,621,424 B2 | 12/2013 | Kejariwal et al. |
| 8,631,034 B1 | 1/2014 | Peloski |
| 8,635,251 B1 | 1/2014 | Chan |
| 8,650,182 B2 | 2/2014 | Murthy |
| 8,660,869 B2 | 2/2014 | MacIntyre et al. |
| 8,676,863 B1 | 3/2014 | Connell et al. |
| 8,683,488 B2 | 3/2014 | Kukreja et al. |
| 8,713,518 B2 | 4/2014 | Pointer et al. |
| 8,719,252 B2 | 5/2014 | Miranker et al. |
| 8,725,707 B2 | 5/2014 | Chen et al. |
| 8,726,254 B2 | 5/2014 | Rohde et al. |
| 8,745,014 B2 | 6/2014 | Travis |
| 8,745,510 B2 | 6/2014 | D'Alo' et al. |
| 8,751,823 B2 | 6/2014 | Myles et al. |
| 8,768,961 B2 | 7/2014 | Krishnamurthy |
| 8,775,412 B2 | 7/2014 | Day et al. |
| 8,788,254 B2 * | 7/2014 | Peloski .............. G06F 17/5009 703/13 |
| 8,793,243 B2 | 7/2014 | Weyerhaeuser et al. |
| 8,805,875 B1 | 8/2014 | Bawcom et al. |
| 8,805,947 B1 | 8/2014 | Kuzkin et al. |
| 8,806,133 B2 | 8/2014 | Hay et al. |
| 8,812,625 B1 | 8/2014 | Chitilian et al. |
| 8,838,656 B1 | 9/2014 | Cheriton |
| 8,855,999 B1 | 10/2014 | Elliot |
| 8,863,156 B1 | 10/2014 | Lepanto et al. |
| 8,874,512 B2 | 10/2014 | Jin et al. |
| 8,880,569 B2 | 11/2014 | Draper et al. |
| 8,880,787 B1 | 11/2014 | Kimmel et al. |
| 8,881,121 B2 | 11/2014 | Ali |
| 8,886,631 B2 | 11/2014 | Abadi et al. |
| 8,903,717 B2 | 12/2014 | Elliot |
| 8,903,842 B2 | 12/2014 | Bloesch et al. |
| 8,922,579 B2 | 12/2014 | Mi et al. |
| 8,924,384 B2 | 12/2014 | Driesen et al. |
| 8,930,892 B2 | 1/2015 | Pointer et al. |
| 8,954,418 B2 | 2/2015 | Faerber et al. |
| 8,959,495 B2 | 2/2015 | Chafi et al. |
| 8,996,864 B2 | 3/2015 | Maigne et al. |
| 9,031,930 B2 | 5/2015 | Valentin |
| 9,077,611 B2 | 7/2015 | Cordray et al. |
| 9,122,765 B1 | 9/2015 | Chen |
| 9,177,079 B1 | 11/2015 | Ramachandran et al. |
| 9,195,712 B2 | 11/2015 | Freedman et al. |
| 9,298,768 B2 | 3/2016 | Varakin et al. |
| 9,311,357 B2 | 4/2016 | Ramesh et al. |
| 9,372,671 B2 | 6/2016 | Balan et al. |
| 9,384,184 B2 | 7/2016 | Cervantes et al. |
| 9,477,702 B1 | 10/2016 | Ramachandran et al. |
| 9,612,959 B2 | 4/2017 | Caudy et al. |
| 9,613,018 B2 | 4/2017 | Zeldis et al. |
| 9,613,109 B2 | 4/2017 | Wright et al. |
| 9,619,210 B2 | 4/2017 | Kent et al. |
| 9,633,060 B2 | 4/2017 | Caudy et al. |
| 9,639,570 B2 | 5/2017 | Wright et al. |
| 9,672,238 B2 | 6/2017 | Wright et al. |
| 9,679,006 B2 | 6/2017 | Wright et al. |
| 9,690,821 B2 | 6/2017 | Wright et al. |
| 9,710,511 B2 | 7/2017 | Wright et al. |
| 9,760,591 B2 | 9/2017 | Caudy et al. |
| 9,805,084 B2 | 10/2017 | Wright et al. |
| 9,832,068 B2 | 11/2017 | McSherry et al. |
| 9,836,494 B2 | 12/2017 | Caudy et al. |
| 9,836,495 B2 | 12/2017 | Wright |
| 9,847,917 B2 | 12/2017 | Varney et al. |
| 9,852,231 B1 * | 12/2017 | Ravi .................. G06N 5/02 |
| 9,886,469 B2 | 2/2018 | Kent et al. |
| 9,898,496 B2 | 2/2018 | Caudy et al. |
| 9,934,266 B2 | 4/2018 | Wright et al. |
| 10,002,153 B2 | 6/2018 | Teodorescu et al. |
| 10,002,154 B1 | 6/2018 | Kent et al. |
| 10,002,155 B1 | 6/2018 | Caudy et al. |
| 10,003,673 B2 | 6/2018 | Caudy et al. |
| 10,019,138 B2 | 7/2018 | Zeldis et al. |
| 10,069,943 B2 | 9/2018 | Teodorescu et al. |
| 10,521,449 B1 | 12/2019 | Schwartz et al. |
| 2002/0002576 A1 | 1/2002 | Wollrath et al. |
| 2002/0007331 A1 | 1/2002 | Lo et al. |
| 2002/0054587 A1 | 5/2002 | Baker et al. |
| 2002/0065981 A1 | 5/2002 | Jenne et al. |
| 2002/0129168 A1 | 9/2002 | Kanai et al. |
| 2002/0156722 A1 | 10/2002 | Greenwood |
| 2003/0004952 A1 * | 1/2003 | Nixon .............. G05B 19/4145 |
| 2003/0004964 A1 * | 1/2003 | Cameron .............. G06F 16/86 |
| 2003/0061216 A1 | 3/2003 | Moses |
| 2003/0074400 A1 | 4/2003 | Brooks et al. |
| 2003/0110416 A1 | 6/2003 | Morrison et al. |
| 2003/0115212 A1 | 6/2003 | Hornibrook et al. |
| 2003/0167261 A1 | 9/2003 | Grust et al. |
| 2003/0177139 A1 * | 9/2003 | Cameron .............. G06F 16/81 |
| 2003/0182261 A1 | 9/2003 | Patterson |
| 2003/0187744 A1 * | 10/2003 | Goodridge, Jr. ...... G06F 3/0481 705/26.1 |
| 2003/0208484 A1 | 11/2003 | Chang et al. |
| 2003/0208505 A1 | 11/2003 | Mullins et al. |
| 2003/0233632 A1 | 12/2003 | Aigen et al. |
| 2004/0002961 A1 | 1/2004 | Dettinger et al. |
| 2004/0015566 A1 | 1/2004 | Anderson et al. |
| 2004/0076155 A1 | 4/2004 | Yajnik et al. |
| 2004/0090472 A1 * | 5/2004 | Risch .................. G06F 16/9038 715/853 |
| 2004/0111492 A1 | 6/2004 | Nakahara et al. |
| 2004/0148630 A1 | 7/2004 | Choi |
| 2004/0186813 A1 | 9/2004 | Tedesco et al. |
| 2004/0216150 A1 | 10/2004 | Scheifler et al. |
| 2004/0220923 A1 | 11/2004 | Nica |
| 2004/0254876 A1 | 12/2004 | Coval et al. |
| 2004/0267824 A1 | 12/2004 | Pizzo et al. |
| 2005/0015490 A1 | 1/2005 | Saare et al. |
| 2005/0060693 A1 | 3/2005 | Robison et al. |
| 2005/0097447 A1 | 5/2005 | Serra et al. |
| 2005/0102284 A1 | 5/2005 | Srinivasan et al. |
| 2005/0102636 A1 | 5/2005 | McKeon et al. |
| 2005/0131893 A1 | 6/2005 | Glan |
| 2005/0132384 A1 | 6/2005 | Morrison et al. |
| 2005/0138624 A1 | 6/2005 | Morrison et al. |
| 2005/0144189 A1 | 6/2005 | Edwards et al. |
| 2005/0165866 A1 | 7/2005 | Bohannon et al. |
| 2005/0198001 A1 | 9/2005 | Cunningham et al. |
| 2005/0228828 A1 | 10/2005 | Chandrasekar et al. |
| 2006/0059253 A1 | 3/2006 | Goodman et al. |
| 2006/0074901 A1 | 4/2006 | Pirahesh et al. |
| 2006/0085490 A1 | 4/2006 | Baron et al. |
| 2006/0100989 A1 | 5/2006 | Chinchwadkar et al. |
| 2006/0101019 A1 | 5/2006 | Nelson et al. |
| 2006/0116983 A1 | 6/2006 | Dettinger et al. |
| 2006/0116999 A1 | 6/2006 | Dettinger et al. |
| 2006/0123024 A1 | 6/2006 | Sathyanarayan et al. |
| 2006/0131383 A1 | 6/2006 | Battagin et al. |
| 2006/0136361 A1 | 6/2006 | Peri et al. |
| 2006/0173693 A1 | 8/2006 | Arazi et al. |
| 2006/0195460 A1 | 8/2006 | Nori et al. |
| 2006/0212847 A1 | 9/2006 | Tarditi et al. |
| 2006/0218123 A1 | 9/2006 | Chowdhuri et al. |
| 2006/0218200 A1 | 9/2006 | Factor et al. |
| 2006/0230016 A1 | 10/2006 | Cunningham et al. |
| 2006/0235786 A1 | 10/2006 | DiSalvo |

(56) References Cited

U.S. PATENT DOCUMENTS

| | | |
|---|---|---|
| 2006/0253311 A1 | 11/2006 | Yin et al. |
| 2006/0271510 A1 | 11/2006 | Harward et al. |
| 2006/0277162 A1 | 12/2006 | Smith |
| 2006/0277319 A1 | 12/2006 | Elien et al. |
| 2007/0011211 A1 | 1/2007 | Reeves et al. |
| 2007/0027884 A1 | 2/2007 | Heger et al. |
| 2007/0033518 A1 | 2/2007 | Kenna et al. |
| 2007/0073765 A1 | 3/2007 | Chen |
| 2007/0101252 A1 | 5/2007 | Chamberlain et al. |
| 2007/0113014 A1* | 5/2007 | Manolov ............ G06F 16/289 711/133 |
| 2007/0116287 A1 | 5/2007 | Rasizade et al. |
| 2007/0118619 A1 | 5/2007 | Schwesig et al. |
| 2007/0169003 A1 | 7/2007 | Branda et al. |
| 2007/0198479 A1 | 8/2007 | Cai et al. |
| 2007/0256060 A1 | 11/2007 | Ryu et al. |
| 2007/0258508 A1 | 11/2007 | Werb et al. |
| 2007/0271280 A1 | 11/2007 | Chandasekaran |
| 2007/0294217 A1 | 12/2007 | Chen et al. |
| 2007/0299822 A1 | 12/2007 | Jopp et al. |
| 2008/0022136 A1 | 1/2008 | Mattsson et al. |
| 2008/0033907 A1 | 2/2008 | Woehler et al. |
| 2008/0034084 A1 | 2/2008 | Pandya |
| 2008/0046804 A1 | 2/2008 | Rui et al. |
| 2008/0072150 A1 | 3/2008 | Chan et al. |
| 2008/0097748 A1 | 4/2008 | Haley et al. |
| 2008/0120283 A1 | 5/2008 | Liu et al. |
| 2008/0155565 A1 | 6/2008 | Poduri |
| 2008/0168135 A1 | 7/2008 | Redlich et al. |
| 2008/0172639 A1 | 7/2008 | Keysar et al. |
| 2008/0235238 A1 | 9/2008 | Jalobeanu et al. |
| 2008/0263179 A1 | 10/2008 | Buttner et al. |
| 2008/0276241 A1 | 11/2008 | Bajpai et al. |
| 2008/0319951 A1 | 12/2008 | Ueno et al. |
| 2009/0019029 A1 | 1/2009 | Tommaney et al. |
| 2009/0022095 A1 | 1/2009 | Spaur et al. |
| 2009/0024615 A1 | 1/2009 | Pedro et al. |
| 2009/0037391 A1 | 2/2009 | Agrawal et al. |
| 2009/0037500 A1 | 2/2009 | Kirshenbaum |
| 2009/0055370 A1 | 2/2009 | Dagum et al. |
| 2009/0083215 A1 | 3/2009 | Burger |
| 2009/0089312 A1 | 4/2009 | Chi et al. |
| 2009/0157723 A1 | 6/2009 | Peuter et al. |
| 2009/0248902 A1 | 10/2009 | Blue |
| 2009/0254516 A1 | 10/2009 | Meiyyappan et al. |
| 2009/0271472 A1 | 10/2009 | Scheifler et al. |
| 2009/0300770 A1 | 12/2009 | Rowney |
| 2009/0319058 A1 | 12/2009 | Rovaglio et al. |
| 2009/0319484 A1 | 12/2009 | Golbandi et al. |
| 2009/0327242 A1 | 12/2009 | Brown et al. |
| 2010/0023952 A1 | 1/2010 | Sandoval et al. |
| 2010/0036801 A1 | 2/2010 | Pirvali et al. |
| 2010/0042587 A1 | 2/2010 | Johnson et al. |
| 2010/0047760 A1 | 2/2010 | Best et al. |
| 2010/0049715 A1 | 2/2010 | Jacobsen et al. |
| 2010/0057835 A1 | 3/2010 | Little |
| 2010/0070721 A1 | 3/2010 | Pugh et al. |
| 2010/0114890 A1 | 5/2010 | Hagar et al. |
| 2010/0161555 A1 | 6/2010 | Nica et al. |
| 2010/0186082 A1 | 7/2010 | Ladki et al. |
| 2010/0199161 A1 | 8/2010 | Aureglia et al. |
| 2010/0205017 A1 | 8/2010 | Sichelman et al. |
| 2010/0205351 A1 | 8/2010 | Wiener et al. |
| 2010/0281005 A1 | 11/2010 | Carlin et al. |
| 2010/0281071 A1 | 11/2010 | Ben-Zvi et al. |
| 2010/0293334 A1 | 11/2010 | Xun et al. |
| 2011/0126110 A1 | 5/2011 | Vilke et al. |
| 2011/0126154 A1 | 5/2011 | Boehler et al. |
| 2011/0153603 A1 | 6/2011 | Adiba et al. |
| 2011/0161378 A1 | 6/2011 | Williamson |
| 2011/0167020 A1 | 7/2011 | Yang et al. |
| 2011/0178984 A1 | 7/2011 | Talius et al. |
| 2011/0194563 A1 | 8/2011 | Shen et al. |
| 2011/0219020 A1 | 9/2011 | Oks et al. |
| 2011/0231389 A1 | 9/2011 | Surna et al. |
| 2011/0314019 A1 | 12/2011 | Peris |
| 2012/0005238 A1* | 1/2012 | Jebara .................. G06Q 30/02 707/798 |
| 2012/0110030 A1 | 5/2012 | Pomponio |
| 2012/0144234 A1 | 6/2012 | Clark et al. |
| 2012/0159303 A1 | 6/2012 | Friedrich et al. |
| 2012/0191446 A1 | 7/2012 | Binsztok et al. |
| 2012/0191582 A1 | 7/2012 | Rance et al. |
| 2012/0192096 A1 | 7/2012 | Bowman et al. |
| 2012/0197868 A1 | 8/2012 | Fauser et al. |
| 2012/0209886 A1 | 8/2012 | Henderson |
| 2012/0215741 A1 | 8/2012 | Poole et al. |
| 2012/0221528 A1 | 8/2012 | Renkes |
| 2012/0246052 A1 | 9/2012 | Taylor et al. |
| 2012/0246094 A1 | 9/2012 | Hsu et al. |
| 2012/0254143 A1 | 10/2012 | Varma et al. |
| 2012/0259759 A1 | 10/2012 | Crist et al. |
| 2012/0296846 A1 | 11/2012 | Teeter |
| 2013/0041946 A1 | 2/2013 | Joel et al. |
| 2013/0080514 A1 | 3/2013 | Gupta et al. |
| 2013/0086107 A1 | 4/2013 | Genochio et al. |
| 2013/0166551 A1 | 6/2013 | Wong et al. |
| 2013/0166556 A1 | 6/2013 | Baeumges et al. |
| 2013/0173667 A1 | 7/2013 | Soderberg et al. |
| 2013/0179460 A1 | 7/2013 | Cervantes et al. |
| 2013/0185619 A1 | 7/2013 | Ludwig |
| 2013/0191370 A1 | 7/2013 | Chen et al. |
| 2013/0198232 A1 | 8/2013 | Shamgunov et al. |
| 2013/0226959 A1 | 8/2013 | Dittrich et al. |
| 2013/0246560 A1 | 9/2013 | Feng et al. |
| 2013/0263123 A1 | 10/2013 | Zhou et al. |
| 2013/0290243 A1 | 10/2013 | Hazel et al. |
| 2013/0304725 A1 | 11/2013 | Nee et al. |
| 2013/0304744 A1 | 11/2013 | McSherry et al. |
| 2013/0311352 A1 | 11/2013 | Kayanuma et al. |
| 2013/0311488 A1 | 11/2013 | Erdogan et al. |
| 2013/0318129 A1 | 11/2013 | Vingralek et al. |
| 2013/0346365 A1 | 12/2013 | Kan et al. |
| 2014/0019494 A1 | 1/2014 | Tang |
| 2014/0026121 A1 | 1/2014 | Jackson et al. |
| 2014/0040203 A1 | 2/2014 | Lu et al. |
| 2014/0046638 A1 | 2/2014 | Peloski |
| 2014/0059646 A1 | 2/2014 | Hannel et al. |
| 2014/0082470 A1* | 3/2014 | Trebas ................ G06F 17/2229 715/217 |
| 2014/0082724 A1 | 3/2014 | Pearson et al. |
| 2014/0095365 A1 | 4/2014 | Potekhina et al. |
| 2014/0136521 A1 | 5/2014 | Pappas |
| 2014/0143123 A1 | 5/2014 | Banke et al. |
| 2014/0149947 A1* | 5/2014 | Blyumen ............ G06F 3/04847 715/863 |
| 2014/0149997 A1 | 5/2014 | Kukreja et al. |
| 2014/0156618 A1 | 6/2014 | Castellano |
| 2014/0156632 A1 | 6/2014 | Yu et al. |
| 2014/0173023 A1 | 6/2014 | Varney et al. |
| 2014/0181036 A1 | 6/2014 | Dhamankar et al. |
| 2014/0181081 A1 | 6/2014 | Veldhuizen |
| 2014/0188924 A1 | 7/2014 | Ma et al. |
| 2014/0195558 A1 | 7/2014 | Murthy et al. |
| 2014/0201194 A1 | 7/2014 | Reddy et al. |
| 2014/0215446 A1 | 7/2014 | Araya et al. |
| 2014/0222768 A1 | 8/2014 | Rambo et al. |
| 2014/0229506 A1 | 8/2014 | Lee |
| 2014/0229874 A1 | 8/2014 | Strauss |
| 2014/0244687 A1 | 8/2014 | Shmueli et al. |
| 2014/0279810 A1 | 9/2014 | Mann et al. |
| 2014/0280522 A1 | 9/2014 | Watte |
| 2014/0282227 A1 | 9/2014 | Nixon et al. |
| 2014/0282444 A1 | 9/2014 | Araya et al. |
| 2014/0282540 A1 | 9/2014 | Bonnet et al. |
| 2014/0289700 A1 | 9/2014 | Srinivasaraghavan et al. |
| 2014/0292765 A1 | 10/2014 | Maruyama et al. |
| 2014/0297611 A1 | 10/2014 | Abbour et al. |
| 2014/0317084 A1 | 10/2014 | Chaudhry et al. |
| 2014/0321280 A1 | 10/2014 | Evans |
| 2014/0324821 A1 | 10/2014 | Meiyyappan et al. |
| 2014/0330700 A1 | 11/2014 | Studnitzer et al. |
| 2014/0330807 A1 | 11/2014 | Weyerhaeuser et al. |
| 2014/0344186 A1 | 11/2014 | Nadler |

(56) References Cited

U.S. PATENT DOCUMENTS

| | | |
|---|---|---|
| 2014/0344391 A1 | 11/2014 | Varney et al. |
| 2014/0358892 A1 | 12/2014 | Nizami et al. |
| 2014/0359574 A1 | 12/2014 | Beckwith et al. |
| 2014/0369550 A1* | 12/2014 | Davis .................. G06F 16/683 382/100 |
| 2014/0372482 A1 | 12/2014 | Martin et al. |
| 2014/0380051 A1 | 12/2014 | Edward et al. |
| 2015/0019516 A1 | 1/2015 | Wein et al. |
| 2015/0026155 A1 | 1/2015 | Martin |
| 2015/0032789 A1 | 1/2015 | Nguyen et al. |
| 2015/0067640 A1 | 3/2015 | Booker et al. |
| 2015/0074066 A1 | 3/2015 | Li et al. |
| 2015/0082218 A1 | 3/2015 | Affoneh et al. |
| 2015/0088894 A1 | 3/2015 | Czarlinska et al. |
| 2015/0095381 A1 | 4/2015 | Chen et al. |
| 2015/0120261 A1 | 4/2015 | Giannacopoulos et al. |
| 2015/0127599 A1 | 5/2015 | Schiebeler |
| 2015/0154262 A1 | 6/2015 | Yang et al. |
| 2015/0172117 A1 | 6/2015 | Dolinsky et al. |
| 2015/0188778 A1 | 7/2015 | Asayag et al. |
| 2015/0205588 A1 | 7/2015 | Bates et al. |
| 2015/0205589 A1 | 7/2015 | Dally |
| 2015/0254298 A1 | 9/2015 | Bourbonnais et al. |
| 2015/0304182 A1 | 10/2015 | Brodsky et al. |
| 2015/0317359 A1 | 11/2015 | Tran et al. |
| 2015/0356157 A1 | 12/2015 | Anderson et al. |
| 2016/0026383 A1 | 1/2016 | Lee et al. |
| 2016/0026442 A1 | 1/2016 | Chhaparia |
| 2016/0065670 A1 | 3/2016 | Kimmel et al. |
| 2016/0085772 A1 | 3/2016 | Vermeulen et al. |
| 2016/0092599 A1 | 3/2016 | Barsness et al. |
| 2016/0103897 A1 | 4/2016 | Nysewander et al. |
| 2016/0125018 A1 | 5/2016 | Tomoda et al. |
| 2016/0147748 A1 | 5/2016 | Florendo et al. |
| 2016/0171070 A1 | 6/2016 | Hrle et al. |
| 2016/0179754 A1 | 6/2016 | Borza et al. |
| 2016/0253294 A1 | 9/2016 | Allen et al. |
| 2016/0316038 A1 | 10/2016 | Jolfaei |
| 2016/0335281 A1 | 11/2016 | Teodorescu et al. |
| 2016/0335304 A1 | 11/2016 | Teodorescu et al. |
| 2016/0335317 A1 | 11/2016 | Teodorescu et al. |
| 2016/0335323 A1 | 11/2016 | Teodorescu et al. |
| 2016/0335330 A1 | 11/2016 | Teodorescu et al. |
| 2016/0335361 A1 | 11/2016 | Teodorescu et al. |
| 2017/0032016 A1 | 2/2017 | Zinner et al. |
| 2017/0161514 A1 | 6/2017 | Dettinger et al. |
| 2017/0177677 A1 | 6/2017 | Wright et al. |
| 2017/0185385 A1 | 6/2017 | Kent et al. |
| 2017/0192910 A1 | 7/2017 | Wright et al. |
| 2017/0206229 A1 | 7/2017 | Caudy et al. |
| 2017/0206256 A1 | 7/2017 | Tsirogiannis et al. |
| 2017/0235794 A1 | 8/2017 | Wright et al. |
| 2017/0235798 A1 | 8/2017 | Wright et al. |
| 2017/0249350 A1 | 8/2017 | Wright et al. |
| 2017/0270150 A1 | 9/2017 | Wright et al. |
| 2017/0316046 A1 | 11/2017 | Caudy et al. |
| 2017/0329740 A1 | 11/2017 | Crawford et al. |
| 2017/0357708 A1 | 12/2017 | Ramachandran et al. |
| 2017/0359415 A1 | 12/2017 | Venkatraman et al. |
| 2018/0004796 A1 | 1/2018 | Kent et al. |
| 2018/0011891 A1 | 1/2018 | Wright et al. |
| 2018/0052879 A1 | 2/2018 | Wright |
| 2018/0137175 A1 | 5/2018 | Teodorescu et al. |

FOREIGN PATENT DOCUMENTS

| | | |
|---|---|---|
| EP | 1198769 B1 | 6/2008 |
| EP | 2199961 A1 | 6/2010 |
| EP | 2423816 A1 | 2/2012 |
| EP | 2743839 A1 | 6/2014 |
| GB | 2397906 A | 8/2004 |
| RU | 2421798 | 6/2011 |
| WO | 2000000879 A2 | 1/2000 |
| WO | 2001079964 A2 | 10/2001 |
| WO | 2011120161 A1 | 10/2011 |
| WO | 2012136627 A1 | 10/2012 |
| WO | WO-2014026220 A1 | 2/2014 |
| WO | 2014143208 A1 | 9/2014 |
| WO | 2016183563 A1 | 11/2016 |

OTHER PUBLICATIONS

Final Office Action dated Aug. 2, 2018, in U.S. Appl. No. 15/154,996.
Final Office Action dated Aug. 28, 2018, in U.S. Appl. No. 15/813,119.
Final Office Action dated Jun. 18, 2018, in U.S. Appl. No. 15/155,005.
Final Office Action dated May 18, 2018, in U.S. Appl. No. 15/654,461.
Non-final Office Action dated Apr. 23, 2018, in U.S. Appl. No. 15/813,127.
Non-final Office Action dated Apr. 5, 2018, in U.S. Appl. No. 15/154,984.
Non-final Office Action dated Aug. 10, 2018, in U.S. Appl. No. 16/004,578.
Non-final Office Action dated Jun. 29, 2018, in U.S. Appl. No. 15/154,974.
Non-final Office Action dated Jun. 8, 2018, in U.S. Appl. No. 15/452,574.
Notice of Allowance dated Apr. 30, 2018, in U.S. Appl. No. 15/155,012.
Notice of Allowance dated Jul. 11, 2018, in U.S. Appl. No. 15/154,995.
Notice of Allowance dated May 4, 2018, in U.S. Appl. No. 15/897,547.
Notice of Allowance dated Sep. 11, 2018, in U.S. Appl. No. 15/608,961.
Ex Parte Quayle Action mailed Aug. 8, 2016, in U.S. Appl. No. 15/154,999.
International Search Report and Written Opinion dated Aug. 18, 2016, in International Appln. No. PCT/US2016/032582 filed May 14, 2016.
International Search Report and Written Opinion dated Aug. 18, 2016, in International Appln. No. PCT/US2016/032584 filed May 14, 2016.
International Search Report and Written Opinion dated Aug. 18, 2016, in International Appln. No. PCT/US2016/032588 filed May 14, 2016.
International Search Report and Written Opinion dated Aug. 18, 2016, in International Appln. No. PCT/US2016/032593 filed May 14, 2016.
International Search Report and Written Opinion dated Aug. 18, 2016, in International Appln. No. PCT/US2016/032597 filed May 14, 2016.
International Search Report and Written Opinion dated Aug. 18, 2016, in International Appln. No. PCT/US2016/032599 filed May 14, 2016.
International Search Report and Written Opinion dated Aug. 18, 2016, in International Appln. No. PCT/US2016/032605 filed May 14, 2016.
International Search Report and Written Opinion dated Aug. 25, 2016, in International Appln. No. PCT/US2016/032590 filed May 14, 2016.
International Search Report and Written Opinion dated Aug. 25, 2016, in International Appln. No. PCT/US2016/032592 filed May 14, 2016.
International Search Report and Written Opinion dated Aug. 4, 2016, in International Appln. No. PCT/US2016/032581 filed May 14, 2016.
International Search Report and Written Opinion dated Jul. 28, 2016, in International Appln. No. PCT/US2016/032586 filed May 14, 2016.
International Search Report and Written Opinion dated Jul. 28, 2016, in International Appln. No. PCT/US2016/032587 filed May 14, 2016.
International Search Report and Written Opinion dated Jul. 28, 2016, in International Appln. No. PCT/US2016/032589 filed May 14, 2016.
International Search Report and Written Opinion dated Sep. 1, 2016, in International Appln. No. PCT/US2016/032596 filed May 14, 2016.

(56) References Cited

OTHER PUBLICATIONS

International Search Report and Written Opinion dated Sep. 1, 2016, in International Appln. No. PCT/US2016/032598 filed May 14, 2016.
International Search Report and Written Opinion dated Sep. 1, 2016, in International Appln. No. PCT/US2016/032601 filed May 14, 2016.
International Search Report and Written Opinion dated Sep. 1, 2016, in International Appln. No. PCT/US2016/032602 filed May 14, 2016.
International Search Report and Written Opinion dated Sep. 1, 2016, in International Appln. No. PCT/US2016/032607 filed May 14, 2016.
International Search Report and Written Opinion dated Sep. 15, 2016, in International Appln. No. PCT/US2016/032591 filed May 14, 2016.
International Search Report and Written Opinion dated Sep. 15, 2016, in International Appln. No. PCT/US2016/032594 filed May 14, 2016.
International Search Report and Written Opinion dated Sep. 15, 2016, in International Appln. No. PCT/US2016/032600 filed May 14, 2016.
International Search Report and Written Opinion dated Sep. 29, 2016, in International Appln. No. PCT/US2016/032595 filed May 14, 2016.
International Search Report and Written Opinion dated Sep. 29, 2016, in International Appln. No. PCT/US2016/032606 filed May 14, 2016.
International Search Report and Written Opinion dated Sep. 8, 2016, in International Appln. No. PCT/US2016/032603 filed May 14, 2016.
International Search Report and Written Opinion dated Sep. 8, 2016, in International Appln. No. PCT/US2016/032604 filed May 14, 2016.
Mallet, "Relational Database Support for Spatio-Temporal Data", Technical Report TR 04-21, Sep. 2004, University of Alberta, Department of Computing Science.
Non-final Office Action dated Aug. 12, 2016, in U.S. Appl. No. 15/155,001.
Non-final Office Action dated Aug. 16, 2016, in U.S. Appl. No. 15/154,993.
Non-final Office Action dated Aug. 19, 2016, in U.S. Appl. No. 15/154,991.
Non-final Office Action dated Aug. 25, 2016, in U.S. Appl. No. 15/154,980.
Non-final Office Action dated Aug. 26, 2016, in U.S. Appl. No. 15/154,995.
Non-final Office Action dated Aug. 8, 2016, in U.S. Appl. No. 15/154,983.
Non-final Office Action dated Aug. 8, 2016, in U.S. Appl. No. 15/154,985.
Non-final Office Action dated Oct. 13, 2016, in U.S. Appl. No. 15/155,009.
Non-final Office Action dated Oct. 27, 2016, in U.S. Appl. No. 15/155,006.
Non-final Office Action dated Oct. 7, 2016, in U.S. Appl. No. 15/154,998.
Non-final Office Action dated Sep. 1, 2016, in U.S. Appl. No. 15/154,979.
Non-final Office Action dated Sep. 1, 2016, in U.S. Appl. No. 15/155,011.
Non-final Office Action dated Sep. 1, 2016, in U.S. Appl. No. 15/155,012.
Non-final Office Action dated Sep. 14, 2016, in U.S. Appl. No. 15/154,984.
Non-final Office Action dated Sep. 16, 2016, in U.S. Appl. No. 15/154,988.
Non-final Office Action dated Sep. 22, 2016, in U.S. Appl. No. 15/154,987.
Non-final Office Action dated Sep. 26, 2016, in U.S. Appl. No. 15/155,005.
Non-final Office Action dated Sep. 29, 2016, in U.S. Appl. No. 15/154,990.
Non-final Office Action dated Sep. 8, 2016, in U.S. Appl. No. 15/154,975.
Non-final Office Action dated Sep. 9, 2016, in U.S. Appl. No. 15/154,996.
Non-final Office Action dated Sep. 9, 2016, in U.S. Appl. No. 15/155,010.
Notice of Allowance dated Oct. 11, 2016, in U.S. Appl. No. 15/155,007.
Notice of Allowance dated Oct. 21, 2016, in U.S. Appl. No. 15/154,999.
Final Office Action dated Jan. 27, 2017, in U.S. Appl. No. 15/154,980.
Final Office Action dated Jan. 31, 2017, in U.S. Appl. No. 15/154,996.
Murray, Derek G. et al. "Naiad: a timely dataflow system." SOSP '13 Proceedings of the Twenty-Fourth ACM Symposium on Operating Systems Principles. p. 439-455. Nov. 2013.
Notice of Allowance dated Dec. 22, 2016, in U.S. Appl. No. 15/155,011.
Notice of Allowance dated Feb. 1, 2017, in U.S. Appl. No. 15/154,988.
Notice of Allowance dated Jan. 30, 2017, in U.S. Appl. No. 15/154,987.
Wes McKinney & PyData Development Team. "pandas: powerful Python data analysis toolkit, Release 0.16.1" Dated May 11, 2015. Retrieved from: http://pandas.pydata.org/pandas-docs/version/0.16.1/index.html.
Wes McKinney & PyData Development Team. "pandas: powerful Python data analysis toolkit, Release 0.18.1" Dated May 3, 2016. Retrieved from: http://pandas.pydata.org/pandas-docs/version/0.18.1/index.html.
"Change Data Capture", Oracle Database Online Documentation 11g Release 1 (11.1), dated Apr. 5, 2016. Retreived from https://web.archive.org/web/20160405032625/http://docs.oracle.com/cd/B28359_01/server.111/b28313/cdc.htm.
"Chapter 24. Query access plans", Tuning Database Performance, DB2 Version 9.5 for Linux, UNIX, and Windows, pp. 301-462, dated Dec. 2010. Retreived from http://public.dhe.ibm.com/ps/products/db2/info/vr95/pdf/en_US/DB2PerfTuneTroubleshoot-db2d3e953.pdf.
"Tracking Data Changes", SQL Server 2008 R2, dated Sep. 22, 2015. Retreived from https://web.archive.org/web/20150922000614/https://technet.microsoft.com/en-us/library/bb933994(v=sql.105).aspx.
Borror, Jefferey A. "Q for Mortals 2.0", dated Nov. 1, 2011. Retrieved from http://code.kx.com/wiki/JB:QforMortals2/contents.
Gai, Lei et al. "An Efficient Summary Graph Driven Method for RDF Query Processing", dated Oct. 27, 2015. Retreived from http://arxiv.org/pdf/1510.07749.pdf.
Lou, Yuan. "A Multi-Agent Decision Support System for Stock Trading", IEEE Network, Jan./Feb. 2002. Retreived from http://www.reading.ac.uk/AcaDepts/si/sisweb13/ais/papers/journal12-A%20multi-agent%20Framework.pdf.
Palpanas, Themistoklis et al. "Incremental Maintenance for Non-Distributive Aggregate Functions", Proceedings of the 28th VLDB Conference, 2002. Retreived from http://www.vldb.org/conf/2002/S22P04.pdf.
Wu, Buwen et al. "Scalable SPARQL Querying using Path Partitioning", 31st IEEE International Conference on Data Engineering (ICDE 2015), Seoul, Korea, Apr. 13-17, 2015. Retreived from http://imada.sdu.dk/~zhou/papers/icde2015.pdf.
"IBM Informix TimeSeries data management", dated Jan. 18, 2016. Retrieved from https://web.archive.org/web/20160118072141/http://www-01.ibm.com/software/data/informix/timeseries/.
"IBM—What is HBase?", dated Sep. 6, 2015. Retrieved from https://web.archive.org/web/20150906022050/http://www-01.ibm.com/software/data/infosphere/hadoop/hbase/.
"SAP HANA Administration Guide", dated Mar. 29, 2016, pp. 290-294. Retrieved from https://web.archive.org/web/20160417053656/http://help.sap.com/hana/SAP_HANA_Administration_Guide_en.pdf.

(56) References Cited

OTHER PUBLICATIONS

"Oracle Big Data Appliance—Perfect Balance Java API", dated Sep. 20, 2015. Retrieved from https://web.archive.org/web/20131220040005/http://docs.oracle.com/cd/E41604_01/doc.22/e41667/toc.htm.
"Oracle Big Data Appliance—X5-2", dated Sep. 6, 2015. Retrieved from https://web.archive.org/web/20150906185409/http://www.oracle.com/technetwork/database/bigdata-appliance/overview/bigdataappliance-datasheet-1883358.pdf.
"Sophia Database—Architecture", dated Jan. 18, 2016. Retrieved from https://web.archive.org/web/20160118052919/http://sphia.org/architecture.html.
"Google Protocol RPC Library Overview", dated Apr. 27, 2016. Retrieved from https://cloud.google.com/appengine/docs/python/tools/protorpc/ (last accessed Jun. 16, 2016).
"Maximize Data Value with Very Large Database Management by SAP® Sybase® IQ", dated 2013. Retrieved from http://www.sap.com/bin/sapcom/en_us/downloadasset.2013-06-jun-11-11.maximize-data-value-with-very-large-database-management-by-sap-sybase-iq-pdf.html.
"Microsoft Azure—Managing Access Control Lists (ACLs) for Endpoints by using PowerShell", dated Nov. 12, 2014. Retrieved from https://web.archive.org/web/20150110170715/http://msdn.microsoft.com/en-us/library/azure/dn376543.aspx.
"IBM InfoSphere BigInsights 3.0.0—Importing data from and exporting data to DB2 by using Sqoop", dated Jan. 15, 2015. Retrieved from https://web.archive.org/web/20150115034058/http://www-01.ibm.com/support/knowledgecenter/SSPT3X_3.0.0/com.ibm.swg.im.infosphere.biginsights.import.doc/doc/data_warehouse_sgoop.html.
"GNU Emacs Manual", dated Apr. 15, 2016, pp. 43-47. Retrieved from https://web.archive.org/web/20160415175915/http://www.gnu.org/software/emacs/manual/html_mono/emacs.html.
"Oracle® Big Data Appliance—Software User's Guide", dated Feb. 2015. Retrieved from https://docs.oracle.com/cd/E55905_01/doc.40/e55814.pdf.
"About Entering Commands in the Command Window", dated Dec. 16, 2015. Retrieved from https://knowledge.autodesk.com/support/autocad/learn-explore/caas/CloudHelp/cloudhelp/2016/ENU/AutoCAD-Core/files/GUID-BB0C3E79-66AF-4557-9140-D31B4CF3C9CF-htm.html (last accessed Jun. 16, 2016).
"Use Formula AutoComplete", dated 2010. Retrieved from https://support.office.com/en-us/article/Use-Formula-AutoComplete-c7c46fa6-3a94-4150-a2f7-34140c1ee4d9 (last accessed Jun. 16, 2016).
Mariyappan, Balakrishnan. "10 Useful Linux Bash_Completion Complete Command Examples (Bash Command Line Completion on Steroids)", dated Dec. 2, 2013. Retrieved from http://www.thegeekstuff.com/2013/12/bash-completion-complete/ (last accessed Jun. 16, 2016).
Cheusheva, Svetlana. "How to change the row color based on a cell's value in Excel", dated Oct. 29, 2013. Retrieved from https://www.ablebits.com/office-addins-blog/2013/10/29/excel-change-row-background-color/ (last accessed Jun. 16, 2016).
Jellema, Lucas. "Implementing Cell Highlighting in JSF-based Rich Enterprise Apps (Part 1)", dated Nov. 2008. Retrieved from http://www.oracle.com/technetwork/articles/adf/jellema-adfcellhighlighting-087850.html (last accessed Jun. 16, 2016).
Adelfio et al. "Schema Extraction for Tabular Data on the Web", Proceedings of the VLDB Endowment, vol. 6, No. 6. Apr. 2013. Retrieved from http://www.cs.umd.edu/~hjs/pubs/spreadsheets-vldb13.pdf.
"Definition of Multicast" by Lexico powered by Oxford at https://www.lexico.com/en/definition/multicast, 2019, p. 1.
"What is a Key-Value Database?" at https://database.guide/what-is-a-key-value-database, Database Concepts, NOSQL, 2019 Database.guide, Jun. 21, 2016, pp. 1-7.
Maria Azbel, How too hide and group columns in Excel AbleBits (2014), https://www.ablebits.com/office-addins-blog/2014/08/06/excel-hide-columns/ (last visited Jan. 18, 2019).
Mark Dodge & Craig Stinson, Microsoft Excel 2010 inside out (2011).
Svetlana Cheusheve, Excel formulas for conditional formatting based on another cell AbleBits (2014), https://www.ablebits.com/office-addins-blog/2014/06/10/excel-conditional-formatting-formulas/comment-page-6/ (last visited Jan. 14, 2019).
Advisory Action dated Dec. 21, 2017, in U.S. Appl. No. 15/154,984.
Breitbart, Update Propagation Protocols for Replicated Databases, SIGMOD '99 Philadelphia PA, 1999, pp. 97-108.
Corrected Notice of Allowability dated Aug. 9, 2017, in U.S. Appl. No. 15/154,980.
Corrected Notice of Allowability dated Jul. 31, 2017, in U.S. Appl. No. 15/154,999.
Corrected Notice of Allowability dated Oct. 26, 2017, in U.S. Appl. No. 15/610,162.
Final Office Action dated Dec. 29, 2017, in U.S. Appl. No. 15/154,974.
Final Office Action dated Jul. 27, 2017, in U.S. Appl. No. 15/154,993.
Kramer, The Combining DAG: A Technique for Parallel Data Flow Analysis, IEEE Transactions on Parallel and Distributed Systems, vol. 5, No. 8, Aug. 1994, pp. 805-813.
Non-final Office Action dated Aug. 14, 2017, in U.S. Appl. No. 15/464,314.
Non-final Office Action dated Dec. 13, 2017, in U.S. Appl. No. 15/608,963.
Non-final Office Action dated Dec. 28, 2017, in U.S. Appl. No. 15/154,996.
Non-final Office Action dated Dec. 28, 2017, in U.S. Appl. No. 15/796,230.
Non-final Office Action dated Feb. 12, 2018, in U.S. Appl. No. 15/466,836.
Non-final Office Action dated Feb. 15, 2018, in U.S. Appl. No. 15/813,112.
Non-final Office Action dated Feb. 28, 2018, in U.S. Appl. No. 15/813,119.
Non-final Office Action dated Jan. 4, 2018, in U.S. Appl. No. 15/583,777.
Non-final Office Action dated Jul. 27, 2017, in U.S. Appl. No. 15/154,995.
Non-final Office Action dated Mar. 20, 2018, in U.S. Appl. No. 15/155,006.
Non-final Office Action dated Nov. 15, 2017, in U.S. Appl. No. 15/654,461.
Non-final Office Action dated Nov. 21, 2017, in U.S. Appl. No. 15/155,005.
Non-final Office Action dated Nov. 30, 2017, in U.S. Appl. No. 15/155,012.
Non-final Office Action dated Oct. 5, 2017, in U.S. Appl. No. 15/428,145.
Notice of Allowance dated Feb. 12, 2018, in U.S. Appl. No. 15/813,142.
Notice of Allowance dated Feb. 26, 2018, in U.S. Appl. No. 15/428,145.
Notice of Allowance dated Jul. 28, 2017, in U.S. Appl. No. 15/155,009.
Notice of Allowance dated Jun. 19, 2017, in U.S. Appl. No. 15/154,980.
Notice of Allowance dated Jun. 20, 2017, in U.S. Appl. No. 15/154,975.
Notice of Allowance dated Mar. 1, 2018, in U.S. Appl. No. 15/464,314.
Notice of Allowance dated Nov. 17, 2017, in U.S. Appl. No. 15/154,993.
Notice of Allowance dated Oct. 6, 2017, in U.S. Appl. No. 15/610,162.
Sobell, Mark G. "A Practical Guide to Linux, Commands, Editors and Shell Programming." Third Edition, dated Sep. 14, 2012. Retrieved from: http://techbus.safaribooksonline.com/book/operating-systems-and-server-administration/linux/9780133085129.
Final Office Action dated Dec. 19, 2016, in U.S. Appl. No. 15/154,995.
Non-final Office Action dated Nov. 17, 2016, in U.S. Appl. No. 15/154,999.
Notice of Allowance dated Dec. 19, 2016, in U.S. Appl. No. 15/155,001.

(56) References Cited

OTHER PUBLICATIONS

Notice of Allowance dated Dec. 7, 2016, in U.S. Appl. No. 15/154,985.
Notice of Allowance dated Nov. 17, 2016, in U.S. Appl. No. 15/154,991.
Notice of Allowance dated Nov. 21, 2016, in U.S. Appl. No. 15/154,983.
Notice of Allowance dated Nov. 8, 2016, in U.S. Appl. No. 15/155,007.
Advisory Action dated Apr. 20, 2017, in U.S. Appl. No. 15/154,980.
Advisory Action dated Apr. 6, 2017, in U.S. Appl. No. 15/154,995.
Advisory Action dated Apr. 2017, in U.S. Appl. No. 15/154,999.
Advisory Action dated Mar. 31, 2017, in U.S. Appl. No. 15/154,996.
Advisory Action dated May 3, 2017, in U.S. Appl. No. 15/154,993.
Corrected Notice of Allowability dated Mar. 10, 2017, in U.S. Appl. No. 15/154,979.
Final Office Action dated Apr. 10, 2017, in U.S. Appl. No. 15/155,006.
Final Office Action dated Feb. 24, 2017, in U.S. Appl. No. 15/154,993.
Final Office Action dated Mar. 1, 2017, in U.S. Appl. No. 15/154,975.
Final Office Action dated Mar. 13, 2017, in U.S. Appl. No. 15/155,012.
Final Office Action dated Mar. 31, 2017, in U.S. Appl. No. 15/155,005.
Final Office Action dated May 15, 2017, in U.S. Appl. No. 15/155,010.
Final Office Action dated May 4, 2017, in U.S. Appl. No. 15/155,009.
Non-final Office Action dated Apr. 19, 2017, in U.S. Appl. No. 15/154,974.
Non-final Office Action dated Mar. 2, 2017, in U.S. Appl. No. 15/154,984.
Notice of Allowance dated Feb. 14, 2017, in U.S. Appl. No. 15/154,979.
Notice of Allowance dated Feb. 28, 2017, in U.S. Appl. No. 15/154,990.
Notice of Allowance dated Mar. 2, 2017, in U.S. Appl. No. 15/154,998.
Notice of Allowance dated Mar. 31, 2017, in U.S. Appl. No. 15/154,998.
Notice of Allowance dated May 10, 2017, in U.S. Appl. No. 15/154,988.
PowerShell Team, Intellisense in Windows PowerShell ISE 3.0, dated Jun. 12, 2012, Windows PowerShell Blog, pp. 1-6 Retrieved: https://biogs.msdn.microsoft.com/powershell/2012/06/12/intellisense-in-windows-powershell-ise-3-0/.
Smith, Ian. "Guide to Using SQL: Computed and Automatic Columns." Rdb Jornal, dated Sep. 2008, retrieved Aug. 15, 2016, retrieved from the Internet <URL: http://www.oracle.com/technetwork/products/rdb/automatic-columns-132042.pdf>.
Hartle, Thom, Conditional Formatting in Excel using CQG's RTD Bate Function (2011), http://news.cqg.com/blogs/exce/l2011/05/conditional-formatting-excel-using-cqgs-rtd-bate-function (last visited Apr. 3, 2019).
Posey, Brien, "How to Combine PowerShell Cmdlets", Jun. 14, 2013 Redmond the Independent Voice of the Microsoft Community (Year: 2013).

* cited by examiner

DYNAMIC UPDATING OF QUERY RESULT DISPLAYS

This application claims the benefit of U.S. Provisional Application No. 62/161,813, entitled "Computer Data System" and filed on May 14, 2015, which is incorporated herein by reference in its entirety.

Embodiments relate generally to computer data systems, and more particularly, to methods, systems and computer readable media for dynamic updating of query result displays.

Some graphical user interfaces may provide a display of information from a database query result. However, in the case of data that is changing over time and would cause a change in a query result over time, a typical static query result display may not provide an up-to-date visualization of the changed data. A need may exist to provide a dynamically updating display of a query result that is changing over time. Also, a need may exist to provide a view of data that is time consistent (e.g., processing data up through time t before any data is displayed for time t).

Some implementations were conceived in light of the above mentioned needs, problems and/or limitations, among other things.

Some implementations can include a method for dynamically updating a remote computer data system data object. The method can include determining, with a processor, that a logical clock has transitioned to a state indicating the start of a data object refresh cycle, and receiving notifications with a listener device. The method can also include processing with a processor any received notifications through an update propagation graph (UPG) of nodes, the nodes representing data object dependencies, and transmitting data object change notifications to any nodes corresponding to data objects affected by the received notifications. The method can further include applying data object notifications to respective data objects to generate updated data objects, and, when an updated data object has a link to an exported data object on a client computer, sending one or more data object update notifications to a client corresponding to the updated data object.

The method can also include receiving, at the client, one or more data object update notifications from a server connected to the client, the data object update notifications can include one or more of updated data and updated indexing information. The method can further include applying the notifications to a client data object to generate an updated client data object, and causing the client to display at least a portion of the updated client data object.

The method can also include receiving, at the client, one or more data object update notifications from a server connected to the client, the data object update notifications can include one or more of updated data and updated indexing information. The method can further include applying the notifications to a client data object to generate an updated client data object, and causing the client to access at least a portion of the updated client data object, and propagating changes through a UPG on the client.

The received notifications can include one or more of an add data, delete data, modify data and reindex data notification. The data object update notifications can include one or more of an add data, delete data, modify data and reindex data notification.

Some implementations can include a method comprising determining a viewport change, and sending an updated visible data object area to a server, wherein the updated visible area is based on the viewport change. The method can also include receiving, from the server, a snapshot of data from the data object corresponding to the updated visible area, and updating an in-memory data object based on the received snapshot. The method can further include causing an updated view to be displayed based on the updated in-memory table.

The viewport change can be caused by one or more of scrolling a view of the in-memory data object, showing or hiding a data object, and programmatically accessing the in-memory data object. The snapshot can include data corresponding to a given set of rows and columns of a tabular data object stored in memory of the server. The server can include a remote query processor. The method can also include providing, for non-displayed data objects, providing all rows and one or more columns of the data object to be considered as a visible region to facilitate further processing.

Some implementations can include system for dynamically updating a remote computer data system data object, the system comprising one or more processors coupled to a nontransitory computer readable medium having stored thereon software instructions that, when executed by the one or more processors, cause the one or more processors to perform operations. The operations can include determining that a logical clock has transitioned to a state indicating the start of a data object refresh cycle, and receiving notifications with a listener device.

The operations can also include processing any received notifications through an update propagation graph (UPG) of nodes, the nodes representing data object dependencies, and transmitting data object change notifications to any nodes corresponding to data objects affected by the received notifications. The operations can further include applying data object notifications to respective data objects to generate updated data objects, and when an updated data object has a link to an exported data object on a client computer, sending one or more data object update notifications to a client corresponding to the updated data object.

The operations can further include receiving, at the client, one or more data object update notifications from a server connected to the client, the data object update notifications can include one or more of updated data and updated indexing information, and applying the notifications to a client data object to generate an updated client data object. The operations can also include causing the client to display at least a portion of the updated client data object.

The operations can further include receiving, at the client, one or more data object update notifications from a server connected to the client, the data object update notifications can include one or more of updated data and updated indexing information, and applying the notifications to a client data object to generate an updated client data object. The operations can also include causing the client to access at least a portion of the updated client data object, and propagating changes through a UPG on the client.

The received notifications can include one or more of an add data, delete data, modify data and reindex data notification. The data object update notifications can include one or more of an add data, delete data, modify data and reindex data notification.

Some implementations can include one or more processors coupled to a nontransitory computer readable medium having stored thereon software instructions that, when executed by the one or more processors, cause the one or more processors to perform. The operations can include determining a viewport change, and sending an updated visible data object area to a server, wherein the updated visible area is based on the viewport change. The operations can also include receiving, from the server, a snapshot of data from the data object corresponding to the updated visible area, and updating an in-memory data object based on the received snapshot. The operations can further include causing an updated view to be displayed based on the updated in-memory table.

The viewport change can be caused by one or more of scrolling a view of the in-memory data object, showing or hiding a data object, and programmatically accessing the in-memory data object. The snapshot can include data corresponding to a given set of rows and columns of a tabular data object stored in memory of the server. The server can include a remote query processor. The operations can further include providing, for non-displayed data objects, providing all rows and one or more columns of the data object to be considered as a visible region to facilitate further processing.

DETAILED DESCRIPTION

Reference may be made herein to the Java programming language, Java classes, Java bytecode and the Java Virtual Machine (JVM) for purposes of illustrating example implementations. It will be appreciated that implementations can include other programming languages (e.g., groovy, Scala, R, Go, etc.), other programming language structures as an alternative to or in addition to Java classes (e.g., other language classes, objects, data structures, program units, code portions, script portions, etc.), other types of bytecode, object code and/or executable code, and/or other virtual machines or hardware implemented machines configured to execute a data system query.

Figure 1:
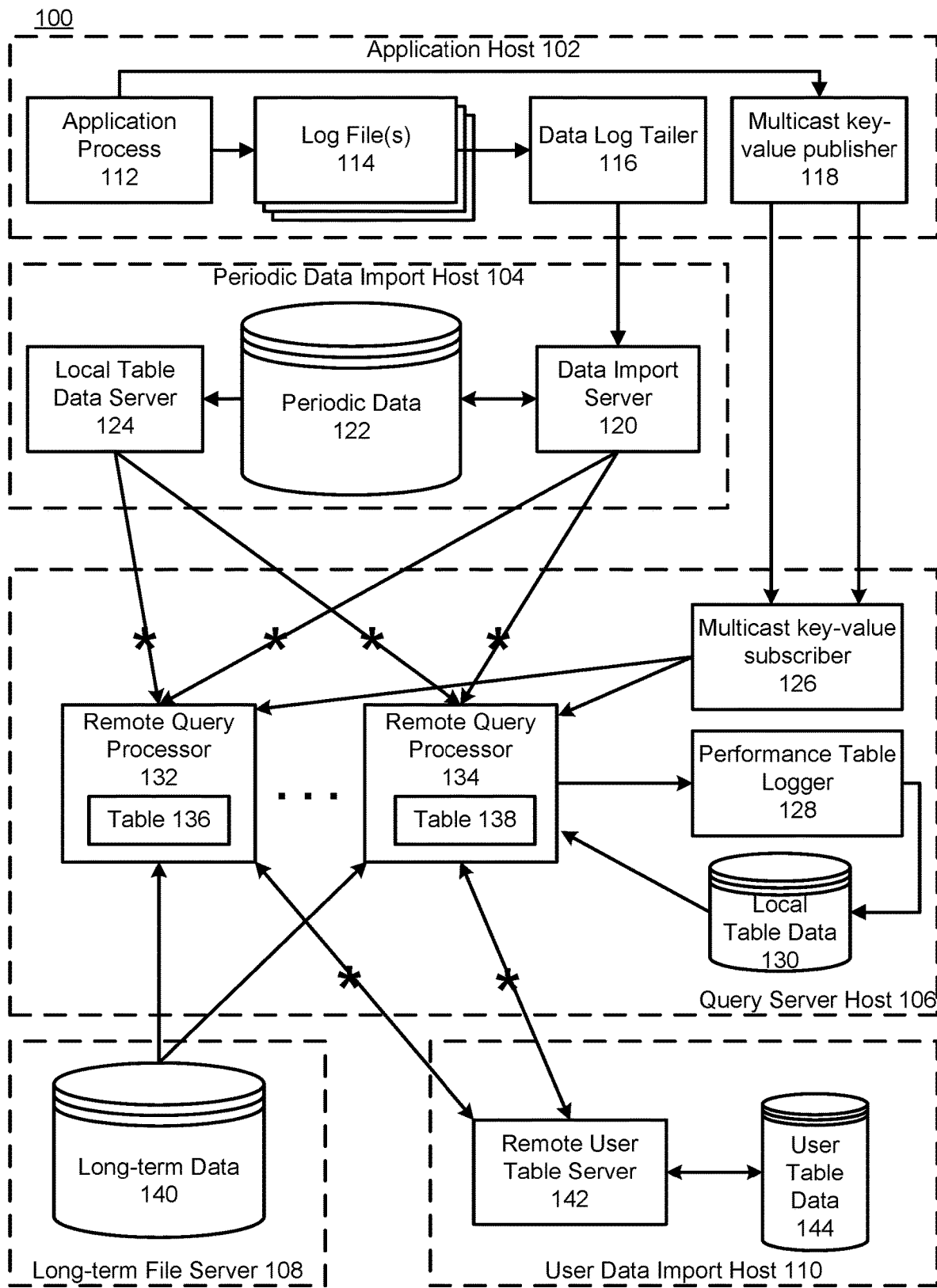
FIG. 1 is a diagram of an example computer data system showing an example data distribution configuration in accordance with some implementations.
Figure 2:
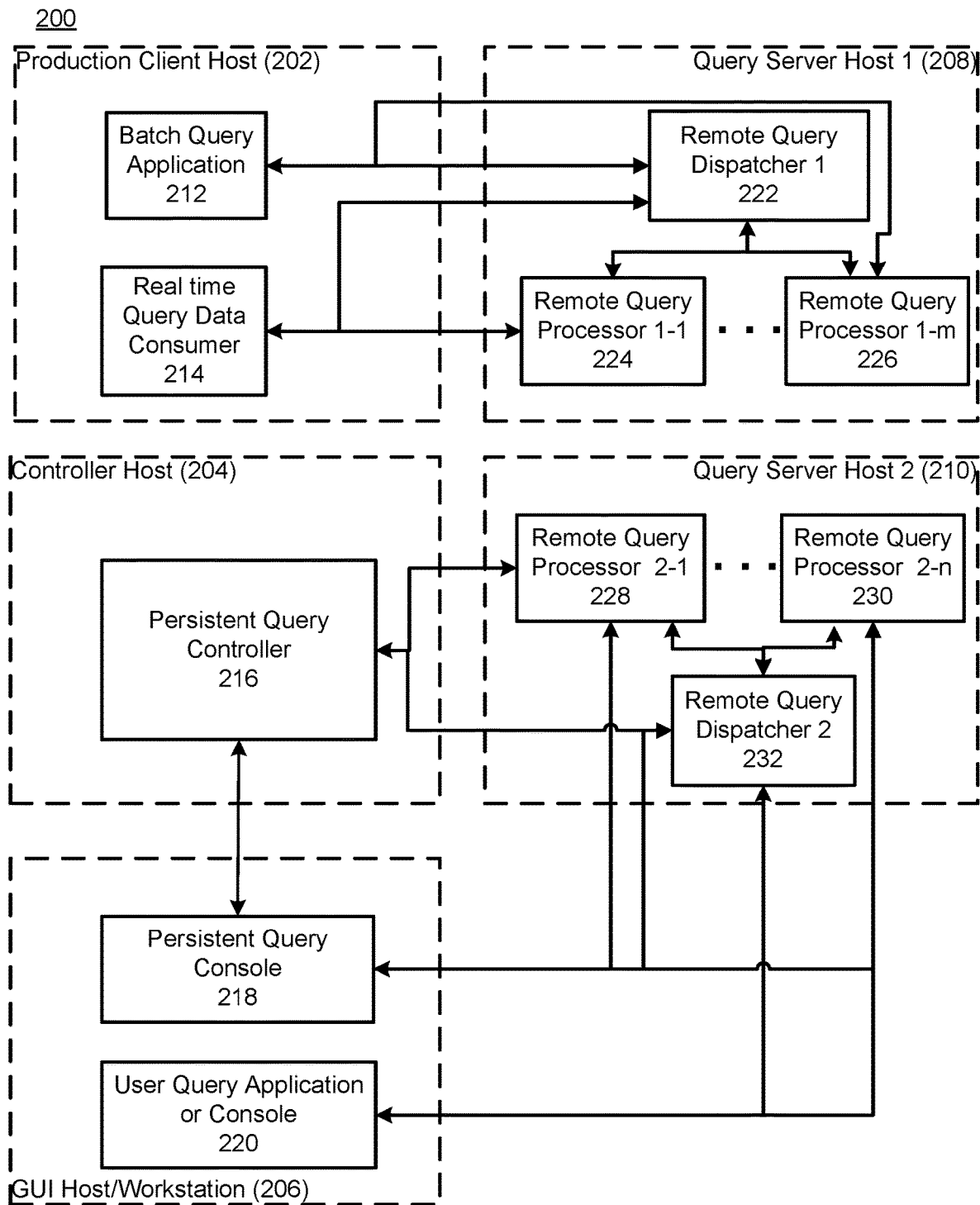
FIG. 2 is a diagram of an example computer data system showing an example administration/process control arrangement in accordance with some implementations.

FIG. 1 is a diagram of an example computer data system and network 100 showing an example data distribution configuration in accordance with some implementations. In particular, the system 100 includes an application host 102, a periodic data import host 104, a query server host 106, a long-term file server 108, and a user data import host 110. While tables are used as an example data object in the description below, it will be appreciated that the data system described herein can also process other data objects such as mathematical objects (e.g., a singular value decomposition of values in a given range of one or more rows and columns of a table), TableMap objects, etc. A TableMap object provides the ability to lookup a Table by some key. This key represents a unique value (or unique tuple of values) from the columns aggregated on in a byExternal( ) statement execution, for example. A TableMap object can be the result of a byExternal( ) statement executed as part of a query. It will also be appreciated that the configurations shown in FIGS. 1 and 2 are for illustration purposes and in a given implementation each data pool (or data store) may be directly attached or may be managed by a file server.

The application host 102 can include one or more application processes 112, one or more log files 114 (e.g., sequential, row-oriented log files), one or more data log tailers 116 and a multicast key-value publisher 118. The periodic data import host 104 can include a local table data server, direct or remote connection to a periodic table data store 122 (e.g., a column-oriented table data store) and a data import server 120. The query server host 106 can include a multicast key-value subscriber 126, a performance table logger 128, local table data store 130 and one or more remote query processors (132, 134) each accessing one or more respective tables (136, 138). The long-term file server 108 can include a long-term data store 140. The user data import host 110 can include a remote user table server 142 and a user table data store 144. Row-oriented log files and column-oriented table data stores are discussed herein for illustration purposes and are not intended to be limiting. It will be appreciated that log files and/or data stores may be configured in other ways. In general, any data stores discussed herein could be configured in a manner suitable for a contemplated implementation.

In operation, the input data application process 112 can be configured to receive input data from a source (e.g., a securities trading data source), apply schema-specified, generated code to format the logged data as it's being prepared for output to the log file 114 and store the received data in the sequential, row-oriented log file 114 via an optional data logging process. In some implementations, the data logging process can include a daemon, or background process task, that is configured to log raw input data received from the application process 112 to the sequential, row-oriented log files on disk and/or a shared memory queue (e.g., for sending data to the multicast publisher 118). Logging raw input data to log files can additionally serve to provide a backup copy of data that can be used in the event that downstream processing of the input data is halted or interrupted or otherwise becomes unreliable.

A data log tailer 116 can be configured to access the sequential, row-oriented log file(s) 114 to retrieve input data logged by the data logging process. In some implementations, the data log tailer 116 can be configured to perform strict byte reading and transmission (e.g., to the data import server 120). The data import server 120 can be configured to store the input data into one or more corresponding data stores such as the periodic table data store 122 in a column-oriented configuration. The periodic table data store 122 can be used to store data that is being received within a time period (e.g., a minute, an hour, a day, etc.) and which may be later processed and stored in a data store of the long-term file server 108. For example, the periodic table data store 122 can include a plurality of data servers configured to store periodic securities trading data according to one or more characteristics of the data (e.g., a data value such as security symbol, the data source such as a given trading exchange, etc.).

The data import server 120 can be configured to receive and store data into the periodic table data store 122 in such a way as to provide a consistent data presentation to other parts of the system. Providing/ensuring consistent data in this context can include, for example, recording logged data to a disk or memory, ensuring rows presented externally are available for consistent reading (e.g., to help ensure that if the system has part of a record, the system has all of the record without any errors), and preserving the order of records from a given data source. If data is presented to clients, such as a remote query processor (132, 134), then the data may be persisted in some fashion (e.g., written to disk).

The local table data server 124 can be configured to retrieve data stored in the periodic table data store 122 and provide the retrieved data to one or more remote query processors (132, 134) via an optional proxy.

The remote user table server (RUTS) 142 can include a centralized consistent data writer, as well as a data server that provides processors with consistent access to the data that it is responsible for managing. For example, users can provide input to the system by writing table data that is then consumed by query processors.

The remote query processors (132, 134) can use data from the data import server 120, local table data server 124 and/or from the long-term file server 108 to perform queries. The remote query processors (132, 134) can also receive data from the multicast key-value subscriber 126, which receives data from the multicast key-value publisher 118 in the application host 102. The performance table logger 128 can log performance information about each remote query processor and its respective queries into a local table data store 130. Further, the remote query processors can also read data from the RUTS, from local table data written by the performance logger, or from user table data read over NFS, for example.

It will be appreciated that the configuration shown in FIG. 1 is a typical example configuration that may be somewhat idealized for illustration purposes. An actual configuration may include one or more of each server and/or host type. The hosts/servers shown in FIG. 1 (e.g., 102-110, 120, 124 and 142) may each be separate or two or more servers may be combined into one or more combined server systems. Data stores can include local/remote, shared/isolated and/or redundant. Any table data may flow through optional proxies indicated by an asterisk on certain connections to the remote query processors. Also, it will be appreciated that the term "periodic" is being used for illustration purposes and can include, but is not limited to, data that has been received within a given time period (e.g., millisecond, second, minute, hour, day, week, month, year, etc.) and which has not yet been stored to a long-term data store (e.g., 140).

FIG. 2 is a diagram of an example computer data system 200 showing an example administration/process control arrangement in accordance with some implementations. The system 200 includes a production client host 202, a controller host 204, a GUI host or workstation 206, and query server hosts 208 and 210. It will be appreciated that there may be one or more of each of 202-210 in a given implementation.

The production client host 202 can include a batch query application 212 (e.g., a query that is executed from a command line interface or the like) and a real time query data consumer process 214 (e.g., an application that connects to and listens to tables created from the execution of a separate query). The batch query application 212 and the real time query data consumer 214 can connect to a remote query dispatcher 222 and one or more remote query processors (224, 226) within the query server host 1 208.

The controller host 204 can include a persistent query controller 216 configured to connect to a remote query dispatcher 232 and one or more remote query processors 228-230. In some implementations, the persistent query controller 216 can serve as the "primary client" for persistent queries and can request remote query processors from dispatchers, and send instructions to start persistent queries. For example, a user can submit a query to 216, and 216 starts and runs the query every day. In another example, a securities trading strategy could be a persistent query. The persistent query controller can start the trading strategy query every morning before the market opened, for instance. It will be appreciated that 216 can work on times other than days. In some implementations, the controller may require its own clients to request that queries be started, stopped, etc. This can be done manually, or by scheduled (e.g., cron) jobs. Some implementations can include "advanced scheduling" (e.g., auto-start/stop/restart, time-based repeat, etc.) within the controller.

The GUI/host workstation can include a user console 218 and a user query application 220. The user console 218 can be configured to connect to the persistent query controller 216. The user query application 220 can be configured to connect to one or more remote query dispatchers (e.g., 232) and one or more remote query processors (228, 230).

Figure 3:
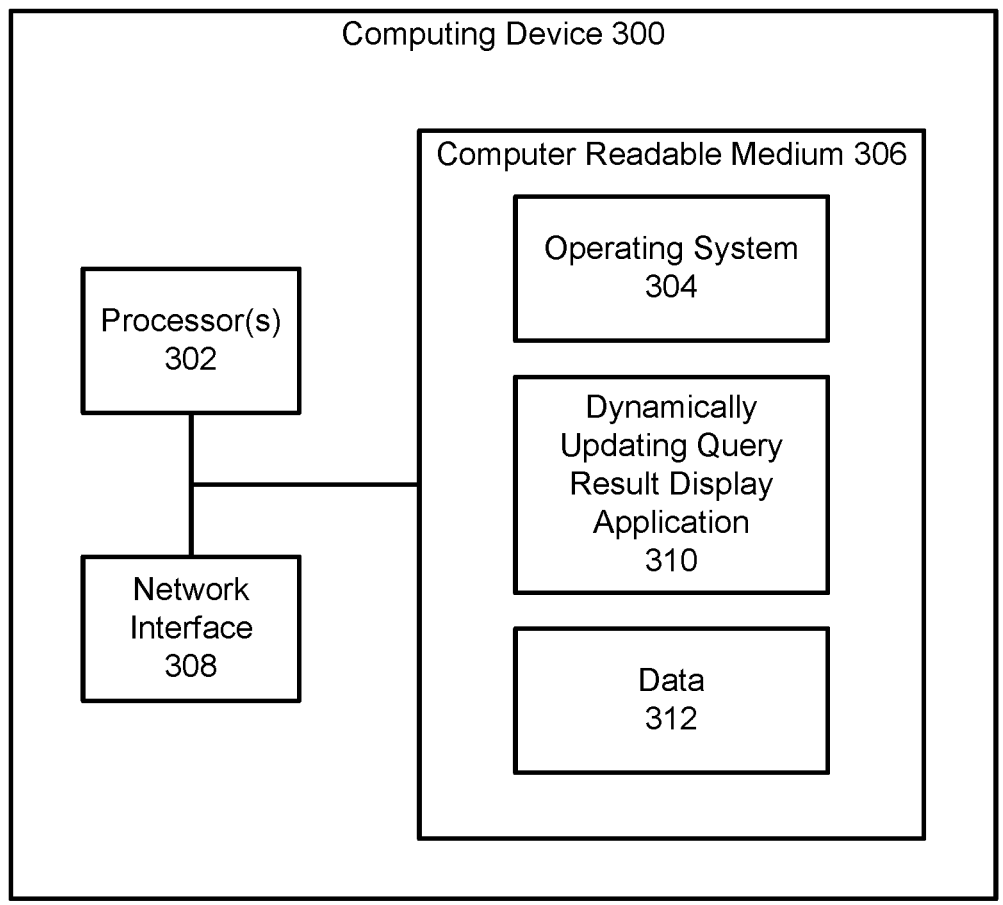
FIG. 3 is a diagram of an example computing device configured for GUI control element processing in accordance with some implementations.

FIG. 3 is a diagram of an example computing device 300 in accordance with at least one implementation. The computing device 300 includes one or more processors 302, operating system 304, computer readable medium 306 and network interface 308. The memory 306 can include a dynamic query result display update application 310 and a data section 312 (e.g., for storing in-memory tables, etc.).

In operation, the processor 302 may execute the application 310 stored in the memory 306. The application 310 can include software instructions that, when executed by the processor, cause the processor to perform operations for dynamic updating of query result displays in accordance with the present disclosure (e.g., performing one or more of 502-512 and/or 702-710 described below).

The application program 310 can operate in conjunction with the data section 312 and the operating system 304.

In general, some implementations can include pushing new data to clients when a data source is updated. A data object may have dependencies to one or more data sources. The data object can include, but is not limited to, a tabular data object (e.g., table or the like), a scalable graph, a mathematical equation object, etc. Also, in some implementations a client may request a particular "slice" of a data object such as a table in two dimensions (e.g., a set of rows and a set of columns) for a corresponding viewport. A viewport can include, for example, a displayed or accessed portion of a table. When the two-dimensional slice changes, a snapshot mechanism sends data which is newly within the viewport, and optionally adjacent data to provide for display in the event a user scrolls a graphical user interface element corresponding to the viewport.

As used herein, a data source can include, but is not limited to, a real time or near real time data source such as securities market data (e.g., over a multicast distribution mechanism (e.g., 118/126) or through a tailer (e.g., 116), system generated data, historical data, user input data from a remote user table server, tables programmatically generated in-memory, or an element upstream in an update propagation graph (UPG) such as a directed acyclic graph (DAG), and/or any data (e.g., a table, mathematical object, etc.) having a capability to refresh itself/provide updated data.

When a data source is updated, it will send add, delete, modify, reindex (AMDR) notifications through the DAG. It will be appreciated that a DAG is used herein for illustration purposes of a possible implementation of the UPG, and that the UPG can include other implementations. A reindex message is a message to change the indexing of a data item, but not change the value. When a table is exported from the server to a client, there is an exported table handle created and that handle attaches itself to the DAG; as a child of the table to be displayed. When the DAG updates, that handle's node in the DAG is reached and a notification is sent across the network to the client that includes the rows which have been added/modified/deleted/reindexed. On the client side, those rows are reconstructed and an in-memory copy of the table (or portion thereof) is maintained for display (or other access).

There can be two cases in which a view is updated. In the first case, a system clock ticks, and there is new data for one or more source (parent) nodes in the DAG, which percolates down to the exported table handle. In the second case, a user changes the "viewport", which is the active set of rows and columns.

There can be various ways the viewport is caused to be updated, such as: (i) scrolling the view of the table, (ii) showing or hiding a table, (iii) when the user or client program programmatically accesses the table, and/or (iv) adding/removing columns from a view. When the viewport is updated, the viewport is automatically adjusted to include the rows/columns that the user is trying to access with exponential expansion up to a limit for efficiency. After a timeout, any automatically created viewports are closed.

A query result may not change without a clock tick that has one or more AMDR messages which traverse the DAG. However, the portion of a query result that is displayed by the user (e.g., the viewport) might change. When a user displays a table, a set of visible columns and rows is computed. In addition to the visible set of rows/columns, the system may compute (and make available for possible display) more data than is visible. For example, the system may compute and make available for possible display three screens of data: the currently visible screen and one screen before and one screen after. If there are multiple views of the same table, either multiple exported table handles are created in which case the views are independent or if a single exported table handle is created, the viewport is the union of the visible sets. As the user scrolls the table, the viewport may change. When the viewport changes, the visible area (with a buffer of rows up and down, and columns left and right, so that scrolling is smooth) is computed and the updated visible area is sent to the server. In response, the server sends a snapshot with relevant portions of those newly visible rows/columns. For non-displayed tables, the visible area can be considered the whole table by the system for further processing so that a consistent table view is available for further processing (e.g., all rows and one or more columns of the data object may be sent to the client).

The snapshot can be generated asynchronously from the DAG update/table refresh loop under the condition that a consistent snapshot (i.e., the clock value remains the same throughout the snapshot) is able to be obtained. If a consistent snapshot is not obtained after a given number of attempts (e.g., three attempts), a lock can be obtained (e.g., the LiveTableMonitor lock) at the end of the current DAG update cycle to lock out updates while the snapshot is created.

Further, the remote query processor (or server) has knowledge of the visible regions and will send data updates for the visible rows/columns (e.g., it can send the entire AMDR message information so the client has information about what has been updated, just not what the actual data is outside of its viewport). This enables the client optionally to cache data even if the data is outside the viewport and only invalidate the data once the data actually changes.

The DAG structure can be maintained in the memory of a remote query processor. Child nodes have hard references back to their parents, and parents have weak references to their children. This ensures that if a child exists, its parent will also exist, but if there are no external references to a child, then a garbage collection event can properly clean the child up (and the parent won't hold onto the child). For the exported table handles, a component (e.g., an ExportedTableHandleManager component) can be configured to hold hard references to the exported tables. If a client disconnects, then the references for its tables can be cleaned up. Clients can also proactively release references.

Figure 4:
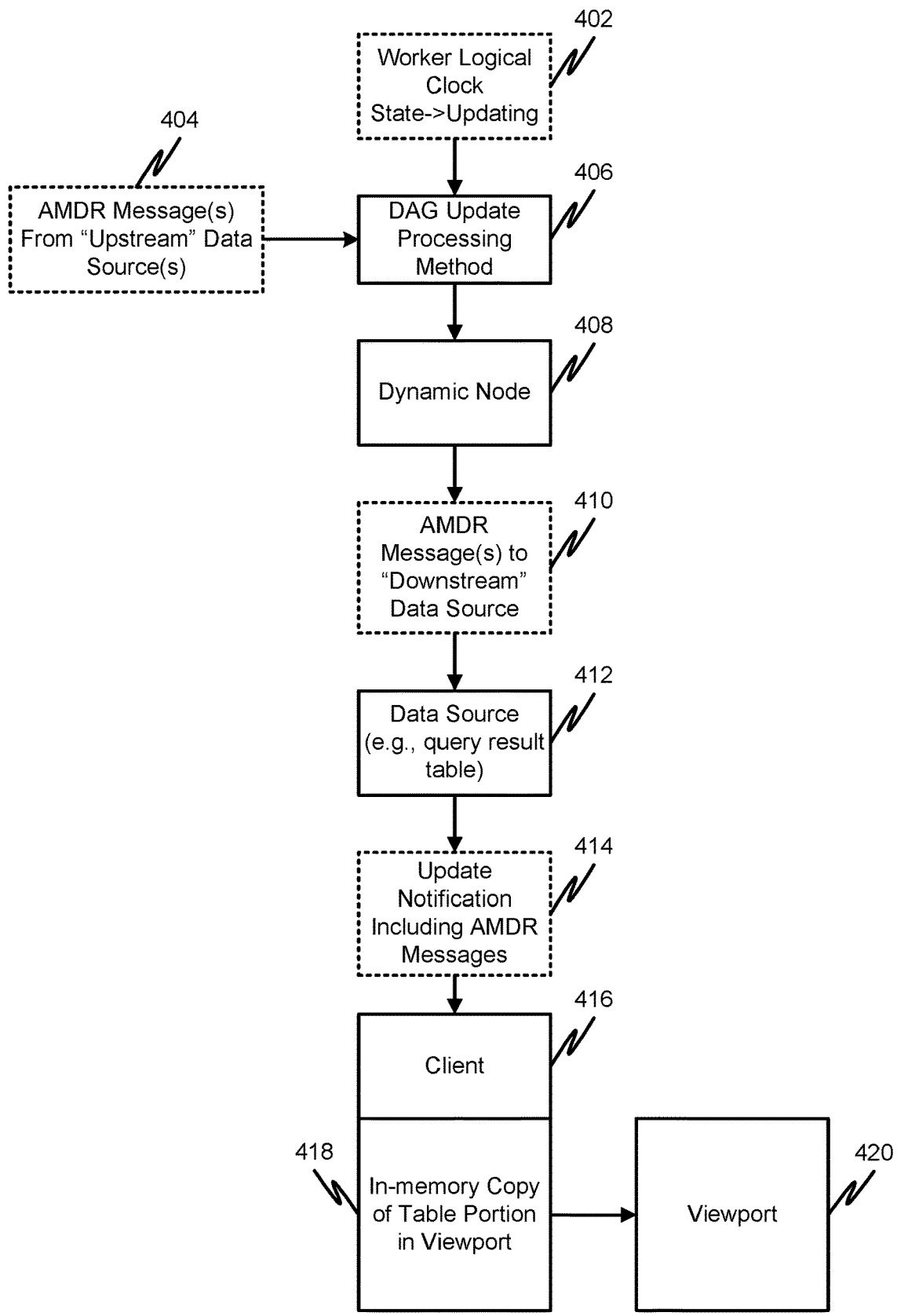
FIG. 4 is a data flow diagram showing an example dynamic query result display operation in accordance with some implementations.

FIG. 4 is a data flow diagram showing an example dynamic query result display operation in accordance with some implementations. At 402, a remote query processor logical clock changes state to "Updating". Each remote query processor can have its own logical clock, which counts upward with two pieces of state. A step (numeric) value and a state (Idle, Updating). The logical clock will proceed along the lines of (step=n, Idle)→(step=n, Updating)→(step=n+1, Idle)→(step=n+1, Updating) and so on as each root node of the DAG is refreshed and all notifications are processed.

At 404, AMDR update notifications from one or more upstream data sources are received. All notifications derived from the same source data update will typically occur during a single Updating phase.

The DAG update processing method executes when the clock state changes to updating. The received change information (e.g., AMDR notifications 404) is processed during the update cycle. Changes are sent to one or more dynamic nodes 408 of the DAG, which can send AMDR messages to one or more downstream data sources 410. The data source 412 can update based on the AMDR notification(s) and send an update notification to 414 to a client 416 having a handle associated with the data source 412.

The client can apply the AMDR notification(s) to an in-memory copy of a table portion 418 and can signal a viewport 420 to update based on the changed table portion 418.

Figure 5:
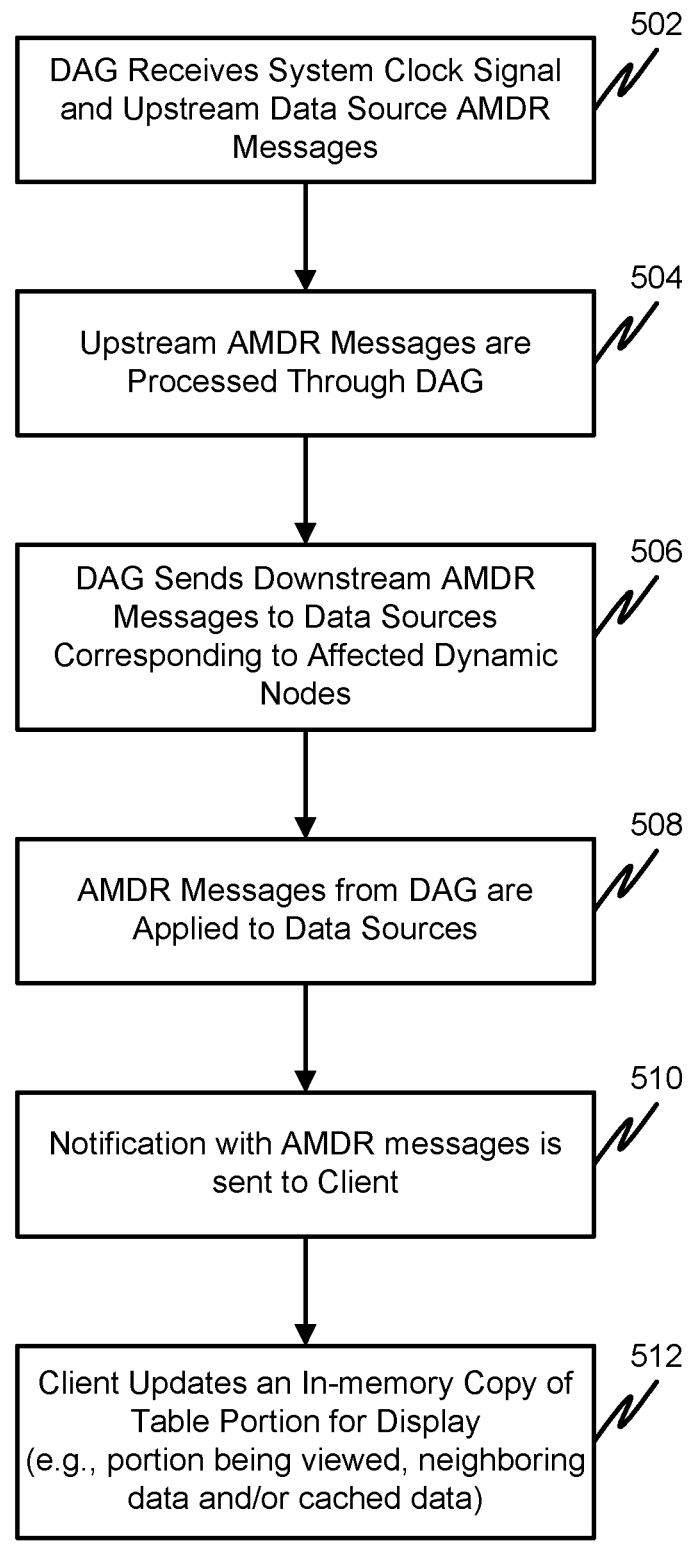
FIG. 5 is a flowchart showing an example method for dynamically updating a query result display in response to a changed data source in accordance with some implementations.

FIG. 5 is a flowchart showing an example method for dynamically updating a query result display in response to a changed data source in accordance with some implementations. Processing begins at 502, where a DAG receives notification of a remote query processor logical clock state change to updating and receives one or more AMDR notification message to be applied to data sources corresponding to one or more dynamic nodes within the DAG. Processing continues to 504.

At 504, the received AMDR notifications are processed through the DAG. Processing continues to 506.

At 506, the DAG sends AMDR notification messages to data sources corresponding to dynamic nodes of the DAG affected by the AMDR notification messages being processed through the DAG. Processing continues to 508.

At 508, the AMDR messages from the DAG are applied to corresponding tables. Processing continues to 510.

At 510, for tables with portions exported to a client, notifications of AMDR messages for the corresponding tables are sent to the respective client. Processing continues to 512.

At 512, each client updates an in-memory copy of a portion of a table based on corresponding AMDR notifications received from the server (e.g., remote query processor).

Figure 6A:
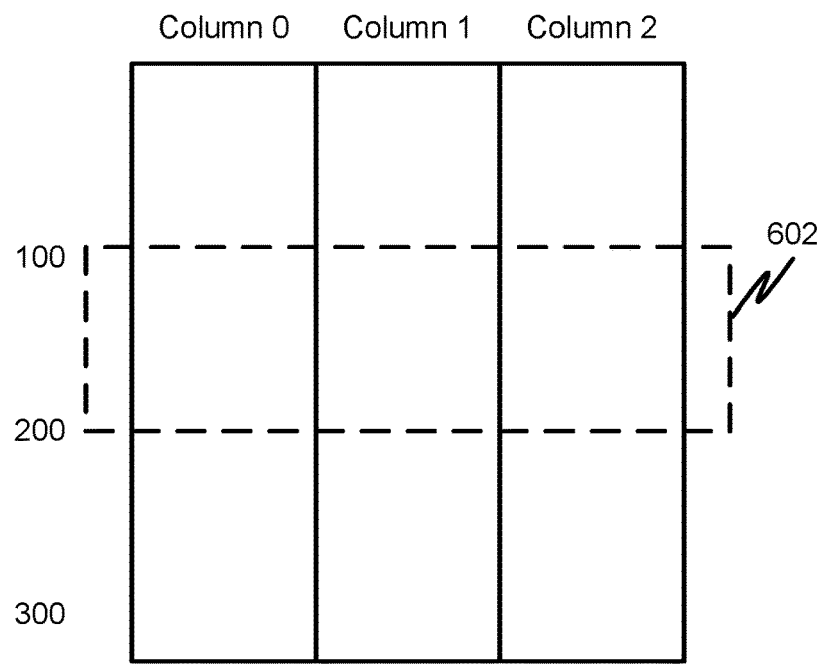
FIGS. 6A and 6B are diagram of an example table section changing in response to a viewport change in accordance with some implementations.
Figure 6B:
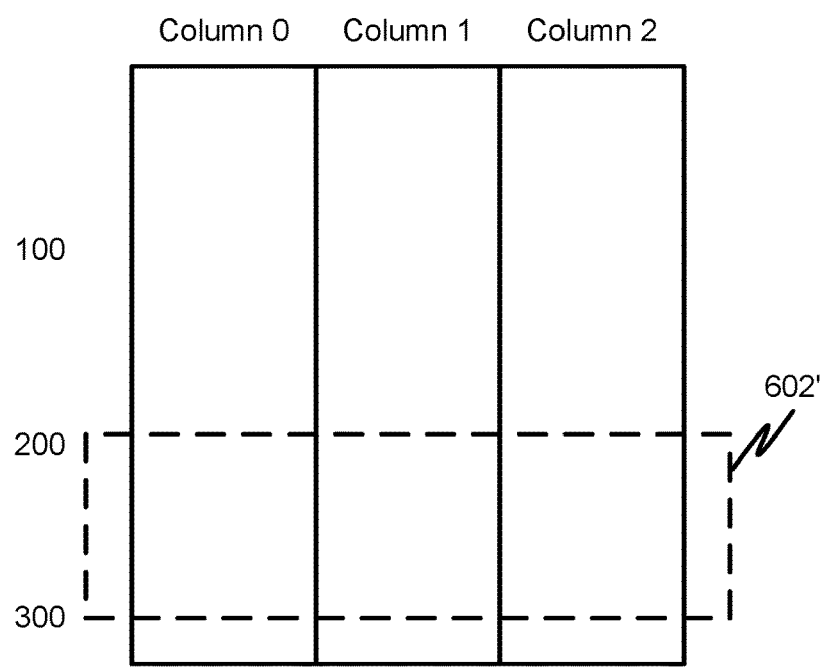

FIGS. 6A and 6B are diagrams of an example table section changing in response to a viewport change in accordance with some implementations. In FIG. 6A, the viewport includes rows 100-200 of Columns 0-2. A user can change the viewport (e.g., scroll to a different set of rows or columns). For example, the user may change the viewport to view rows 200-300 of columns 0-1 as shown in FIG. 6B. The process for dynamically updating the query (or table) display is described below in connection with FIG. 7.

Figure 7:
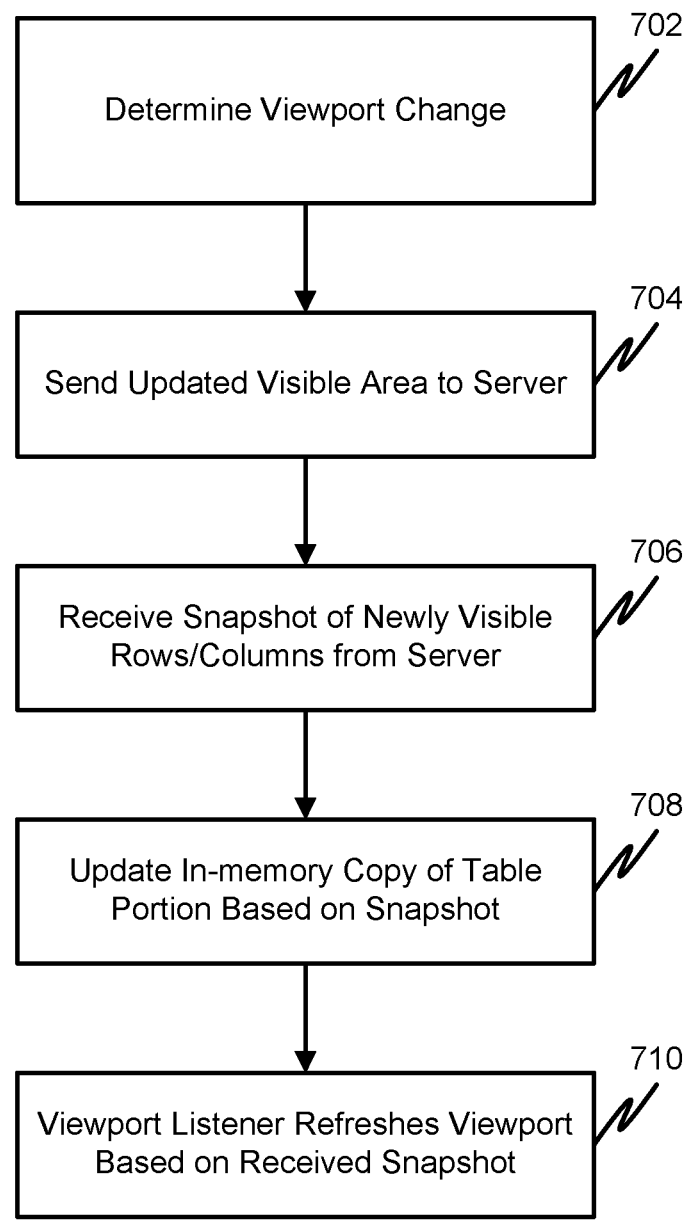
FIG. 7 is a flowchart of an example method for dynamically updating a query result display in response to a viewport change in accordance with some implementations.

FIG. 7 is a flowchart of an example method for dynamically updating a query result display in response to a viewport change in accordance with some implementations. Processing begins at 702, where a client process determines that a change has occurred in a viewport. For example, as mentioned above, there can be three ways in which the portion of a table within the viewport can change: (i) scrolling the view of the table, (ii) showing or hiding a table, and (iii) when the user or client program programmatically accesses the table. For example, from user applications the value of a particular cell or all the columns in a row can be obtained. To make this appear seamless, the system can increase the size of the viewport to include that cell/row (and potentially its neighbors, doubling on every miss, for example). The cell will remain in the viewport for a defined period of time (e.g., 1000 ms), or until the programmatic access moves. Some implementations permit persistent queries to provide custom actions, which are small snippets of code executed client side against the table. They, like other programmatic access use this mechanism to retrieve cells from the table. Processing continues to 704.

At 704, the client sends the updated visible area to the server (e.g., remote query processor). The updated visible area could include an indication of the rows and/or columns within the updated viewport. Processing continues to 706.

At 706, the server responds to the client with a snapshot of the data from the newly visible rows and/or columns visible in the viewport. The snapshot may include additional data around the viewport area. Some implementations can use "pages" of data (e.g., 5 k chunk of a column). These pages for a column are what get buffered. A system can determine the size of a page on a user's display. The span of the table can be defined as the first row to the last row+2 (to account for partially displayed rows); with a minimum size of 10. The first row of the viewport can be the first visible row less the span (with a minimum of row 0). The last row can be the first row of the viewport plus 3 times the span. The viewport may purposefully be larger than the table, so that if new updates come in and the user is already at the bottom of the table; those updates will be displayed. This may result in the viewport being updated (if the table view is following the end of the data). Processing continues to 708.

At 708, the client updates an in-memory copy of a portion of the table using the snapshot received from the server. Processing continues to 710.

At 710, a viewport listener receives a signal that the viewport data has been updated and causes an updated viewport to be displayed. For example, in some implementations, an I/O subsystem can receive the snapshot (or delta update) and enqueue it for a monitoring process (e.g., a LiveTableMonitor or LTM) on the client. Once an update is received, the LiveTableMonitor cycle can be accelerated so there are no intervening sleeps and process the table updates. The LTM will activate a GUI signal (e.g., a Java swing event) that causes a repaint or refresh of the GUI on a display.

It will be appreciated that 502-512 and/or 702-710 can be repeated in whole or in part in order to accomplish a given dynamic query result/table display updating task.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC), a field programmable gate array (FPGA), GPGPU, GPU, or the like. The instructions can be compiled from source code instructions provided in accordance with a programming language such as Java, C, C++, C#.net, assembly or the like. The instructions can also comprise code and data objects provided in accordance with, for example, the Visual Basic™ language, a specialized database query language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, or the like.

It is, therefore, apparent that there is provided, in accordance with the various embodiments disclosed herein, methods, systems and computer readable media for dynamic updating of query result displays.

Application Ser. No. 15/154,974, entitled "DATA PARTITIONING AND ORDERING" and filed in the United States Patent and Trademark Office on May 14, 2016, is hereby incorporated by reference herein in its entirety as if fully set forth herein.

Application Ser. No. 15/154,975, entitled "COMPUTER DATA SYSTEM DATA SOURCE REFRESHING USING AN UPDATE PROPAGATION GRAPH" and filed in the United States Patent and Trademark Office on May 14, 2016, is hereby incorporated by reference herein in its entirety as if fully set forth herein.

Application Ser. No. 15/154,979, entitled "COMPUTER DATA SYSTEM POSITION-INDEX MAPPING" and filed in the United States Patent and Trademark Office on May 14, 2016, is hereby incorporated by reference herein in its entirety as if fully set forth herein.

Application Ser. No. 15/154,980, entitled "SYSTEM PERFORMANCE LOGGING OF COMPLEX REMOTE QUERY PROCESSOR QUERY OPERATIONS" and filed in the United States Patent and Trademark Office on May 14, 2016, is hereby incorporated by reference herein in its entirety as if fully set forth herein.

Application Ser. No. 15/154,983, entitled "DISTRIBUTED AND OPTIMIZED GARBAGE COLLECTION OF REMOTE AND EXPORTED TABLE HANDLE LINKS TO UPDATE PROPAGATION GRAPH NODES" and filed in the United States Patent and Trademark Office on May 14, 2016, is hereby incorporated by reference herein in its entirety as if fully set forth herein.

Application Ser. No. 15/154,984, entitled "COMPUTER DATA SYSTEM CURRENT ROW POSITION QUERY LANGUAGE CONSTRUCT AND ARRAY PROCESSING QUERY LANGUAGE CONSTRUCTS" and filed in the United States Patent and Trademark Office on May 14, 2016, is hereby incorporated by reference herein in its entirety as if fully set forth herein.

Application Ser. No. 15/154,985, entitled "PARSING AND COMPILING DATA SYSTEM QUERIES" and filed in the United States Patent and Trademark Office on May 14, 2016, is hereby incorporated by reference herein in its entirety as if fully set forth herein.

Application Ser. No. 15/154,987, entitled "DYNAMIC FILTER PROCESSING" and filed in the United States Patent and Trademark Office on May 14, 2016, is hereby incorporated by reference herein in its entirety as if fully set forth herein.

Application Ser. No. 15/154,988, entitled "DYNAMIC JOIN PROCESSING USING REAL-TIME MERGED NOTIFICATION LISTENER" and filed in the United States Patent and Trademark Office on May 14, 2016, is hereby incorporated by reference herein in its entirety as if fully set forth herein.

Application Ser. No. 15/154,990, entitled "DYNAMIC TABLE INDEX MAPPING" and filed in the United States Patent and Trademark Office on May 14, 2016, is hereby incorporated by reference herein in its entirety as if fully set forth herein.

Application Ser. No. 15/154,991, entitled "QUERY TASK PROCESSING BASED ON MEMORY ALLOCATION AND PERFORMANCE CRITERIA" and filed in the United States Patent and Trademark Office on May 14, 2016, is hereby incorporated by reference herein in its entirety as if fully set forth herein.

Application Ser. No. 15/154,993, entitled "A MEMORY-EFFICIENT COMPUTER SYSTEM FOR DYNAMIC UPDATING OF JOIN
PROCESSING" and filed in the United States Patent and Trademark Office on May 14, 2016, is hereby incorporated by reference herein in its entirety as if fully set forth herein.

Application Ser. No. 15/154,995, entitled "QUERY DISPATCH AND EXECUTION ARCHITECTURE" and filed in the United States Patent and Trademark Office on May 14, 2016, is hereby incorporated by reference herein in its entirety as if fully set forth herein.

Application Ser. No. 15/154,996, entitled "COMPUTER DATA DISTRIBUTION ARCHITECTURE" and filed in the United States Patent and Trademark Office on May 14, 2016, is hereby incorporated by reference herein in its entirety as if fully set forth herein.

Application Ser. No. 15/154,997, entitled "DYNAMIC UPDATING OF QUERY RESULT DISPLAYS" and filed in the United States Patent and Trademark Office on May 14, 2016, is hereby incorporated by reference herein in its entirety as if fully set forth herein.

Application Ser. No. 15/154,998, entitled "DYNAMIC CODE LOADING" and filed in the United States Patent and Trademark Office on May 14, 2016, is hereby incorporated by reference herein in its entirety as if fully set forth herein.

Application Ser. No. 15/154,999, entitled "IMPORTATION, PRESENTATION, AND PERSISTENT STORAGE OF DATA" and filed in the United States Patent and Trademark Office on May 14, 2016, is hereby incorporated by reference herein in its entirety as if fully set forth herein.

Application Ser. No. 15/155,001, entitled "COMPUTER DATA DISTRIBUTION ARCHITECTURE" and filed in the United States Patent and Trademark Office on May 14, 2016, is hereby incorporated by reference herein in its entirety as if fully set forth herein.

Application Ser. No. 15/155,005, entitled "PERSISTENT QUERY DISPATCH AND EXECUTION ARCHITECTURE" and filed in the United States Patent and Trademark Office on May 14, 2016, is hereby incorporated by reference herein in its entirety as if fully set forth herein.

Application Ser. No. 15/155,006, entitled "SINGLE INPUT GRAPHICAL USER INTERFACE CONTROL ELEMENT AND METHOD" and filed in the United States Patent and Trademark Office on May 14, 2016, is hereby incorporated by reference herein in its entirety as if fully set forth herein.

Application Ser. No. 15/155,007, entitled "GRAPHICAL USER INTERFACE DISPLAY EFFECTS FOR A COMPUTER DISPLAY SCREEN" and filed in the United States Patent and Trademark Office on May 14, 2016, is hereby incorporated by reference herein in its entirety as if fully set forth herein.

Application Ser. No. 15/155,009, entitled "COMPUTER ASSISTED COMPLETION OF HYPERLINK COMMAND SEGMENTS" and filed in the United States Patent and Trademark Office on May 14, 2016, is hereby incorporated by reference herein in its entirety as if fully set forth herein.

Application Ser. No. 15/155,010, entitled "HISTORICAL DATA REPLAY UTILIZING A COMPUTER SYSTEM" and filed in the United States Patent and Trademark Office on May 14, 2016, is hereby incorporated by reference herein in its entirety as if fully set forth herein.

Application Ser. No. 15/155,011, entitled "DATA STORE ACCESS PERMISSION SYSTEM WITH INTERLEAVED APPLICATION OF DEFERRED ACCESS CONTROL FILTERS" and filed in the United States Patent and Trademark Office on May 14, 2016, is hereby incorporated by reference herein in its entirety as if fully set forth herein.

Application Ser. No. 15/155,012, entitled "REMOTE DATA OBJECT PUBLISHING/SUBSCRIBING SYSTEM HAVING A MULTICAST KEY-VALUE PROTOCOL" and filed in the United States Patent and Trademark Office on May 14, 2016, is hereby incorporated by reference herein in its entirety as if fully set forth herein.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A method for dynamically updating a remote computer data system data object, the method comprising:
    exporting, with a processor, a data object to a client separate from the processor and adding an exported data object handle to an update propagation graph (UPG) of nodes, the nodes representing data object dependencies, the exported data object handle being added as a child of the data object in the UPG of nodes, the exported data object handle linking the data object to the exported data object on the client, wherein the data object includes one or more data values structured along one or more dimensions of the data object;
    determining, with a processor, that a state of a logical clock has transitioned to a state indicating a start of a data object refresh cycle, the logical clock comprising a step value and the state, the state being selected from a group comprising the state indicating the start of a data object refresh cycle and a state indicating an idle state;
    receiving notifications with a listener device;
    processing with a processor any received notifications through the update propagation graph (UPG) of nodes, the nodes representing data object dependencies;
    transmitting, with the processor, data object change notifications to any nodes corresponding to data objects affected by the received notifications, wherein one or more of the nodes, in turn, send update notifications to one or more downstream data sources, the one or more downstream data sources including the exported data object handle linking the data object to the exported data object on the client such that the one or more of the nodes sending update notifications includes sending one or more of the update notifications to the client to update the exported data object specific to the client separate from the processor;
    applying data object notifications to respective data objects to generate updated data objects;
    determining that one of the updated data objects has a link to the exported data object on the client and sending one or more data object update notifications to the client corresponding to the updated data object;
    after the determining, transitioning the state of the logical clock to the state indicating an idle state and updating the step value of the logical clock to a different value;
    receiving, at the client, one or more data object update notifications, the data object update notifications include one or more of updated data and updated indexing information; and
    propagating, with the client, changes through a UPG on the client, the client being remote from the processor and the UPG on the client being different than the UPG of nodes processed by the processor,
    wherein a component is configured to store a hard reference to the data object for each exported data object handle such that the data object persists when there is at least one hard reference to the data object corresponding to the exported data object handle, and
    wherein the hard reference is removed when the client disconnects or when the client releases a reference to the data object.

2. The method of claim 1, further comprising:
    applying the notifications to a client data object to generate an updated client data object; and
    causing the client to display at least a portion of the updated client data object.

3. The method of claim 1, further comprising:
    applying the notifications to a client data object to generate an updated client data object; and
    causing the client to access at least a portion of the updated client data object.

4. The method of claim 1, wherein the received notifications include a reindex data notification.

5. The method of claim 1, wherein the data object update notifications include a reindex data notification.

6. A system for dynamically updating a remote computer data system data object, the system comprising:
    one or more processors coupled to a nontransitory computer readable medium having stored thereon software instructions that, when executed by the one or more processors, cause the one or more processors to perform operations including:

exporting, with a processor, a data object to a client separate from the processor and adding an exported data object handle to an update propagation graph (UPG) of nodes, the nodes representing data object dependencies, the exported data object handle being added as a child of the data object in the UPG of nodes, the exported data object handle linking the data object to the exported data object on the client;

determining that a state of a logical clock has transitioned to a state indicating a start of a data object refresh cycle, the logical clock comprising a step value and the state, the state being selected from a group comprising the state indicating the start of a data object refresh cycle and a state indicating an idle state;

receiving notifications with a listener device;

processing any received notifications through the update propagation graph (UPG) of nodes, the nodes representing data object dependencies;

transmitting, with the processor, data object change notifications to any nodes corresponding to data objects affected by the received notifications, wherein one or more of the nodes, in turn, send update notifications to one or more downstream data sources, the one or more downstream data sources including the exported data object handle linking the data object to the exported data object on the client such that the one or more of the nodes sending update notifications includes sending one or more of the update notifications to the client to update the exported data object specific to the client separate from the processor, and wherein the data object change notifications correspond to one or more data values of the data object and affect one or more other data values of the data object that are different from the one or more data values of the data object;

applying data object notifications to respective data objects to generate updated data objects, wherein the updated data objects include the one or more data values and the one or more other data values different from the one or more data values, and wherein the updated data objects are generated asynchronously from the start of the data object refresh cycle to ensure consistency between the one or more data values of the updated objects and the one or more other data values of the updated objects;

when one of the updated data objects has a link to the exported data object on the client, sending one or more data object update notifications to the client corresponding to the updated data object;

after the determining, transitioning the state of the logical clock to the state indicating an idle state and updating the step value of the logical clock to a different value;

receiving, at the client, one or more data object update notifications, the data object update notifications include one or more of updated data and updated indexing information; and propagating, with the client, changes through a UPG on the client, the client being remote from the processor and the UPG on the client being different than the UPG of nodes processed by the processor, wherein a component is configured to store a hard reference to the data object for each exported table handle such that the data object persists when there is at least one hard reference to the data object corresponding to the exported table handle, and wherein the hard reference is removed if the client disconnects or if the client releases a reference to the data object.

7. The system of claim 6, wherein the operations further include:
applying the notifications to a client data object to generate an updated client data object; and
causing the client to display at least a portion of the updated client data object.

8. The system of claim 6, wherein the operations further include:
applying the notifications to a client data object to generate an updated client data object; and
causing the client to access at least a portion of the updated client data object.

9. The system of claim 6, wherein the received notifications include a reindex data notification.

10. The system of claim 6, wherein the data object update notifications include a reindex data notification.

11. A method for dynamically updating a remote computer data system data object, the method comprising:
exporting, with a processor, a data object to a client separate from the processor and adding an exported data object handle to an update propagation graph (UPG) of nodes, the nodes representing data object dependencies, the exported data object handle being added as a child of the data object in the UPG of nodes, the exported data object handle linking the data object to the exported data object on the client, wherein the data object includes one or more data values structured along one or more dimensions of the data object;

determining, with a processor, that a state of a logical clock has transitioned to a state indicating a start of a data object refresh cycle, the logical clock comprising a step value and the state, the state being selected from a group comprising the state indicating the start of the data object refresh cycle and a state indicating an idle state;

receiving notifications with a listener device;

processing with a processor any received notifications through the update propagation graph (UPG) of nodes, the nodes representing data object dependencies;

transmitting, with the processor, data object change notifications to any nodes corresponding to data objects affected by the received notifications, wherein one or more of the nodes, in turn, send update notifications to one or more downstream data sources, the one or more downstream data sources including the exported data object handle linking the data object to the exported data object on the client such that the one or more of the nodes sending update notifications includes sending one or more of the update notifications to the client to update the exported data object specific to the client separate from the processor, and wherein the data object change notifications correspond to the one or more data values of the data object and affect one or more other data values of the data object different from the one or more data values of the data object;

applying data object notifications to respective data objects to generate updated data objects, wherein the updated data objects include the one or more data values and the one or more other data values different from the one or more data values of the data object, and wherein the updated data objects are generated asynchronously from the start of the data object refresh cycle to ensure consistent relationship between the one or more data values of the updated objects and the one or more other data values of the updated objects;
determining that one of the updated data objects has a link to the exported data object on the client and sending one or more data object update notifications to the client corresponding to the updated data object;
after the determining, transitioning the state of the logical clock to the state indicating an idle state and updating the step value of the logical clock to a different value;
receiving, at the client, one or more data object update notifications, the data object update notifications include one or more of updated data and updated indexing information; and
propagating, with the client, changes through a UPG on the client, the client being remote from the processor and the UPG on the client being different than the UPG of nodes processed by the processor,
wherein a component is configured to store a hard reference to the data object for each exported data object handle such that the data object persists when there is at least one hard reference to the data object corresponding to the exported data object handle, and wherein the hard reference is removed when the client disconnects or when the client releases a reference to the data object.

12. The method of claim 11, wherein all notifications corresponding to a data update source are processed during the data object refresh cycle.

13. The method of claim 11, further comprising:
applying the notifications to a client data object to generate an updated client data object; and
causing the client to perform one or more of accessing at least a portion of the updated client data object or displaying at least a portion of the updated client data object.

14. The method of claim 1, wherein the received notifications include a reindex data notification.

15. The method of claim 1, wherein the data object update notifications include a reindex data notification.

16. A method for dynamically updating a remote computer data system data object, the method comprising:
exporting, with a processor, a data object to a client separate from the processor and adding an exported data object handle to an update propagation graph (UPG) of nodes, the nodes representing data object dependencies, the exported data object handle being added as a child of the data object in the UPG of nodes, the exported data object handle linking the data object to the exported data object on the client, wherein the data object includes one or more data values structured along one or more dimensions of the data object;
determining, with a processor, that a state of a logical clock has transitioned to a state indicating a start of a data object refresh cycle;
receiving notifications with a listener device;
processing with a processor any received notifications through the update propagation graph (UPG) of nodes, the nodes representing data object dependencies;
transmitting, with the processor, data object change notifications to any nodes corresponding to data objects affected by the received notifications, wherein one or more of the nodes, in turn, send update notifications to one or more downstream data sources, the one or more downstream data sources including the exported data object handle linking the data object to the exported data object on the client such that the one or more of the nodes sending update notifications includes sending one or more of the update notifications to the client to update the exported data object specific to the client separate from the processor, and wherein the data object change notifications correspond to the one or more data values of the data object and affect one or more other data values of the data object different from the one or more data values of the data object;
applying data object notifications to respective data objects to generate updated data objects, wherein the updated data objects include the one or more data values and the one or more other data values different from the one or more data values, and wherein the updated data objects are generated asynchronously from the start of the data object refresh cycle to ensure consistency between the one or more data values of the updated objects and the one or more other data values of the updated objects, and wherein additional updates are locked out after one or more attempts to ensure consistency between the one or more data values of the updated objects and the one or more other data values of the updated objects;
determining that one of the updated data objects has a link to the exported data object on the client and sending one or more data object update notifications to the client corresponding to the updated data object;
receiving, at the client, one or more data object update notifications, the data object update notifications include one or more of updated data and updated indexing information; and
propagating, with the client, changes through a UPG on the client, the client being remote from the processor and the UPG on the client being different than the UPG of nodes processed by the processor.

17. The method of claim 16, wherein all notifications corresponding to a data update source occur during the data object refresh cycle.

18. The method of claim 16, further comprising:
applying the notifications to a client data object to generate an updated client data object; and
causing the client to one or more of access or display at least a portion of the updated client data object.

19. The method of claim 18, further comprising:
caching the updated client data object, including the one or more data values and the one or more other data values of the one of the updated objects; and
removing the cached updated client data object after one or more of the one or more data values or the one or more other data values change.

20. The method of claim 16, wherein the received notifications include a reindex data notification.

* * * * *